(12) United States Patent
Yoshida

(10) Patent No.: US 9,076,369 B2
(45) Date of Patent: Jul. 7, 2015

(54) IMAGE MODULATION APPARATUS, METHOD, AND PROGRAM

(71) Applicant: Atsushi Yoshida, Tokyo (JP)

(72) Inventor: Atsushi Yoshida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 105 days.

(21) Appl. No.: 13/754,968

(22) Filed: Jan. 31, 2013

(65) Prior Publication Data

US 2013/0207995 A1  Aug. 15, 2013

(30) Foreign Application Priority Data

Feb. 9, 2012  (JP) .................. 2012-026622

(51) Int. Cl.
*G09G 5/02* (2006.01)
*G06F 3/14* (2006.01)
*G09G 5/00* (2006.01)

(52) U.S. Cl.
CPC .............. *G09G 5/02* (2013.01); *G06F 3/1454* (2013.01); *G09G 5/003* (2013.01); *G09G 2320/0693* (2013.01); *G09G 2370/042* (2013.01)

(58) Field of Classification Search
CPC ..... G06F 3/14; G06F 11/261; G06F 17/5009; G09G 5/02; G09G 5/06; G09G 2340/06; H04N 1/60; H04N 1/622; H04N 1/6052; H04N 1/6013

See application file for complete search history.

(56) References Cited

U.S. PATENT DOCUMENTS 8,610,739 B2 * 12/2013 Lonkar .................. 345/590

FOREIGN PATENT DOCUMENTS

| JP | 2000-295483 | 10/2000 |
|----|-------------|---------|
| JP | 2001-060082 | 3/2001  |
| JP | 2004-032399 | 1/2004  |
| JP | 2004-192386 | 7/2004  |
| JP | 2005-005802 | 1/2005  |

\* cited by examiner

*Primary Examiner* — Antonio A Caschera
(74) *Attorney, Agent, or Firm* — Harness, Dickey & Pierce, P.L.C.

(57) ABSTRACT

An image modulation apparatus includes a device information obtaining unit to obtain device property information of a plurality of display devices respectively disposed at a plurality of image distribution destination apparatuses; a simulated image generator to generate a simulated image to be displayed on each of the display devices disposed at each of the image distribution destination apparatuses based on a distribution target image, to be transmitted to each of the image distribution destination apparatuses, and the device property information of each of the display devices obtained by the device information obtaining unit; and an image modulation unit to modulate the distribution target image based on a modulation instruction prepared for the plurality of the simulated images simulated by the simulated image generator.

7 Claims, 20 Drawing Sheets

FIG. 13

| Hue | Sat | Lum | ΔH + | ΔH − | ΔC + | ΔC − | ΔL + | ΔL − |
|---|---|---|---|---|---|---|---|---|
| 0 | High | High | Dev3 | Dev8 | Dev3 | Dev10 | Dev6 | Dev15 |
| | | Mid | Dev3 | Dev8 | Dev3 | Dev10 | Dev6 | Dev15 |
| | | Low | Dev3 | Dev7 | Dev2 | Dev7 | Dev6 | Dev15 |
| | Low | High | Dev3 | Dev11 | Dev3 | Dev10 | Dev6 | Dev14 |
| | | Mid | Dev3 | Dev11 | Dev2 | Dev8 | Dev5 | Dev16 |
| | | Low | Dev2 | Dev11 | Dev2 | Dev7 | Dev5 | Dev16 |
| 30 | High | High | Dev3 | Dev7 | Dev3 | Dev10 | Dev6 | Dev15 |
| | | Mid | Dev3 | Dev7 | Dev3 | Dev10 | Dev6 | Dev15 |
| | | Low | Dev2 | Dev7 | Dev2 | Dev7 | Dev6 | Dev15 |
| | Low | High | Dev3 | Dev11 | Dev2 | Dev9 | Dev6 | Dev15 |
| | | Mid | Dev3 | Dev11 | Dev2 | Dev8 | Dev5 | Dev15 |
| | | Low | Dev2 | Dev12 | Dev2 | Dev7 | Dev5 | Dev16 |
| | | | ⋮ | | | | | |
| 330 | High | High | Dev20 | Dev22 | Dev20 | Dev24 | Dev20 | Dev30 |
| | | Mid | Dev19 | Dev23 | Dev25 | Dev24 | Dev19 | Dev31 |
| | | Low | Dev18 | Dev22 | Dev18 | Dev24 | Dev19 | Dev31 |
| | Low | High | Dev20 | Dev23 | Dev20 | Dev24 | Dev21 | Dev31 |
| | | Mid | Dev20 | Dev23 | Dev28 | Dev24 | Dev20 | Dev31 |
| | | Low | Dev18 | Dev23 | Dev28 | Dev24 | Dev18 | Dev31 |

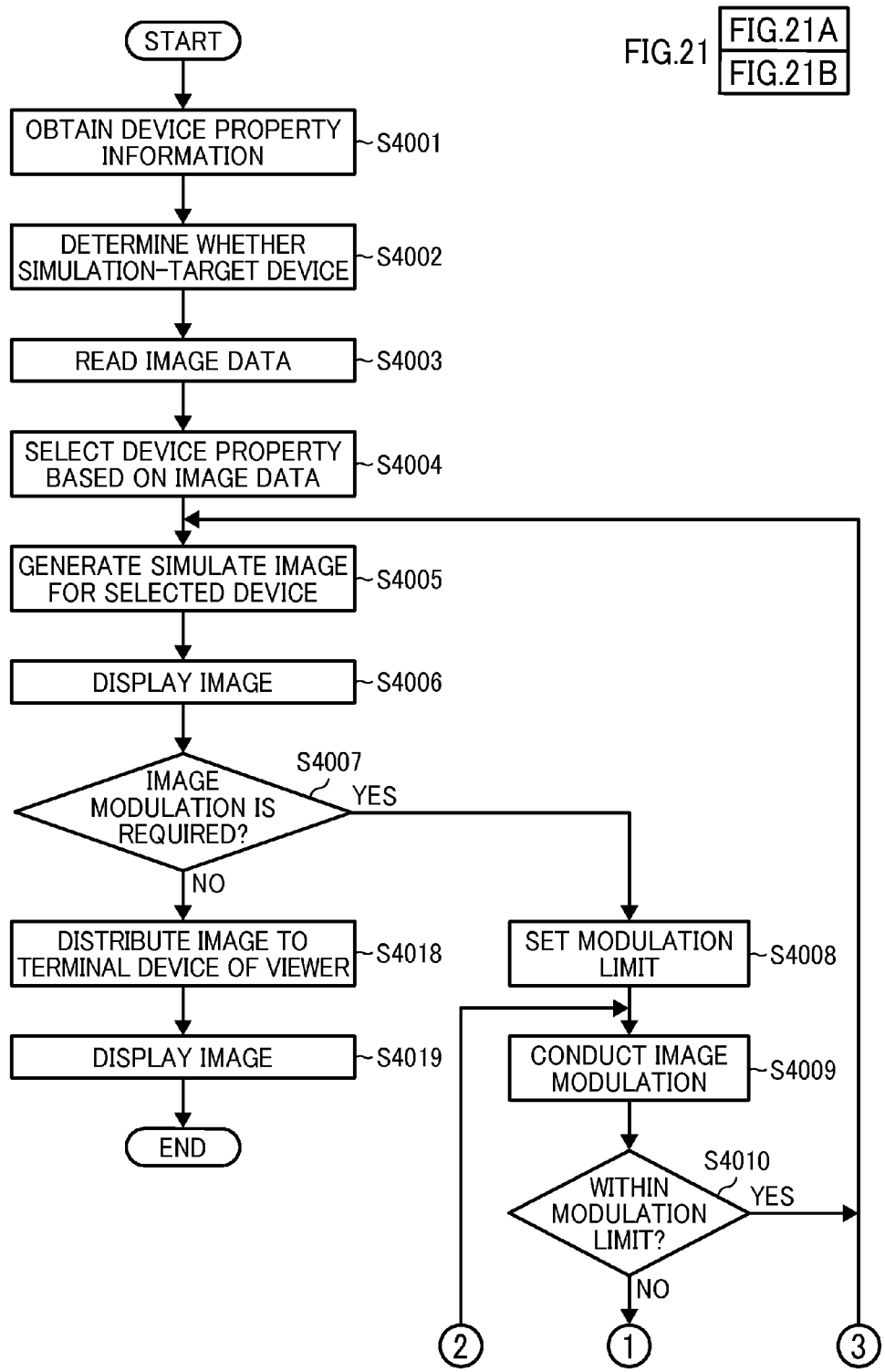

IMAGE MODULATION APPARATUS, METHOD, AND PROGRAM

CROSS-REFERENCE TO RELATED APPLICATION

This application claims priority pursuant to 35 U.S.C. §119 to Japanese Patent Application No. 2012-026622, filed on Feb. 9, 2012 in the Japan Patent Office, the disclosure of which is incorporated by reference herein in its entirety.

BACKGROUND

1. Technical Field

The present invention relates to an image modulation apparatus, an image modulation method, and an image modulation program.

2. Background Art

With the development of network technology, one can easily access networks from personal computers (PCs), portable terminal devices, and tablet terminal devices to view web pages on networks, for example, and purchase goods from web stores and through net auctions.

Typically, the images of goods such as display images taken by scanners and digital cameras have a different appearance from actual goods themselves, and one may feel some oddness when comparing the actual goods with their display images. Therefore, color-matching technologies to reproduce the actual goods as faithfully as possible via the web have been developed based on the properties of the input devices and display devices.

For example, JP-2004-32399-A discloses an image color reproduction system to faithfully reproduce colors of images at a client apparatus (i.e., a distribution destination apparatus) transmitted via a network using a server (i.e., a distribution originating apparatus). In this system, the server provides color chart data to the client apparatus, a color chart displayed at the client apparatus is captured by a digital camera, and then color information of the original color chart data and the color chart data captured by the digital camera are transmitted to the server together with the device properties of the digital camera. The properties of a display device can then be determined based on such data, and the image is corrected based on the device properties.

However, in such an image color reproduction system, the server is required to convert images based on the device properties of the client display devices and then transmit the converted image data, which puts a heavy burden on the server.

In an image conversion system having a different configuration from that of the above-described system, the server transmits data of images converted according to the properties of the input device, and the client converts the image data according to the properties of the display device. However, such an arrangement requires each client to have its own image conversion system.

SUMMARY

In one aspect of the present invention, an image modulation apparatus is devised. The image modulation apparatus includes a device information obtaining unit, using a processing device, to obtain device property information of a plurality of display devices respectively disposed at a plurality of image distribution destination apparatuses; a simulated image generator, using the processing device, to generate a simulated image to be displayed on each of the display devices disposed at each of the image distribution destination apparatuses based on a distribution target image to be transmitted to each of the image distribution destination apparatuses and the device property information of each of the display devices obtained by the device information obtaining unit; and an image modulation unit, using the processing device, to modulate the distribution target image based on a modulation instruction prepared for the plurality of the simulated images simulated by the simulated image generator.

In another aspect of the present invention, a method of image modulation is devised. The method includes the steps of obtaining device property information of a plurality of display devices respectively disposed at a plurality of image distribution destination apparatuses; generating a simulated image to be displayed on each of the display devices disposed at each of the distribution destination apparatuses based on a distribution target image to be transmitted to each of the image distribution destination apparatuses and the device property information of each of the display devices obtained by the obtaining; displaying a plurality of simulated images generated by the simulating; and modulating the distribution target image based on a modulation instruction prepared for the plurality of the simulated images displayed by the displaying.

In another aspect of the present invention, a non-transitory computer-readable storage medium storing a program that, when executed by a computer, causes the computer to execute a method of image modulation is devised. The method includes the steps of obtaining device property information of a plurality of display devices respectively disposed at a plurality of image distribution destination apparatuses; generating a simulated image to be displayed on each of the display devices disposed at each of the distribution destination apparatuses based on a distribution target image to be transmitted to each of the image distribution destination apparatuses and the device property information of each of the display devices obtained by the obtaining; displaying a plurality of simulated images generated by the simulating; and modulating the distribution target image based on a modulation instruction prepared for the plurality of the simulated images displayed by the displaying.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 13 shows an example of database storing information of simulation target devices at an image modulation apparatus according to the second example embodiment;

FIGS. 21A and 21B show a flowchart of steps of an operation of image distribution system including an image modulation apparatus according to the fourth example embodiment.

Figure 1:
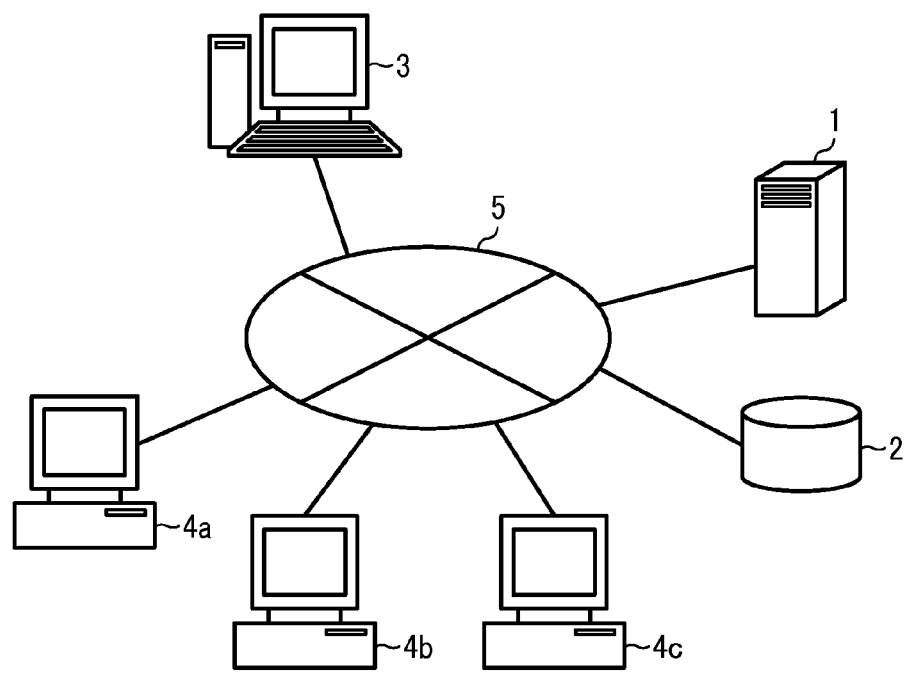
FIG. 1 shows an example configuration of an image distribution system including an image modulation apparatus according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that, have a similar function, operate in a similar manner, and achieve a similar result. Referring now to the drawings, apparatuses or systems according to example embodiments are described hereinafter.

First Example Embodiment

A description is given of a configuration of an image distribution system. FIG. 1 shows an image distribution system including an image modulation apparatus according to a first example embodiment.

The image distribution system including an image modulation apparatus according to a first example embodiment can be configured with, for example, a server 1, an electronic terminal device 3, electronic terminal devices 4a, 4b, 4c, and an auxiliary storage 2, which can be connected by a network 5 such as local area network (LAN) and wide area network (WAN).

The server 1 controls the image distribution system as a whole. The electronic terminal device 3 (hereinafter, may be also referred hereinafter, creator terminal device 3) may be used by a creator such as a web-designer who creates image contents. The electronic terminal devices 4a, 4b, 4c (hereinafter, also referred to user terminal devices 4a, 4b, 4c or user terminal device 4) may be used by users to view the image contents. The auxiliary storage 2 may store information used for image modulation, and may be used when data size used for image modulation becomes too great.

The electronic terminal device 3 used by the creator and the electronic terminal devices 4a, 4b, 4c used by the users are electronic or digital terminal devices such as PCs, cell phones, tablet terminal devices used for creating and/or viewing images. Typically, a plurality of such terminal devices can be connected to the network 5.

Further, the configuration of the creator terminal device 3 and the user terminal devices 4a, 4b, 4c may not be so different, and thereby one terminal device can be used as the creator terminal device 3 and also the user terminal devices 4a, 4b, 4c. Hereinafter, the electronic terminal devices 4a, 4b, 4c may be referred to the user terminal device 4.

Figure 2:
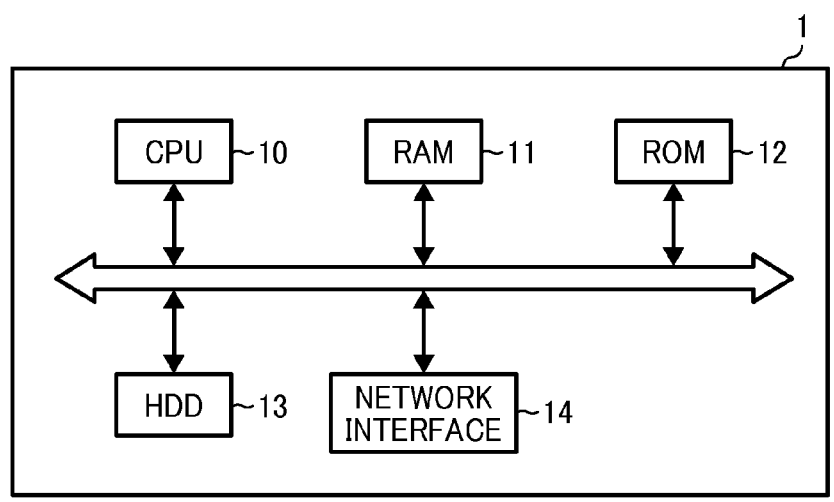
FIG. 2 shows an example of a hardware block diagram of the image modulation apparatus according to the first example embodiment.

A description is given of a hardware configuration of server 1. FIG. 2 shows an example of a hardware block diagram of the server 1. The server 1 includes, for example, a central processing unit (CPU) 10, a random access memory (RAM) 11, a read only memory (ROM) 12, a hard disk drive (HDD) 13, and a network interface 14, connectable with each other by using a bus.

The CPU 10 controls each unit based on programs and commands, and conducts given computing processes as required. The RAM 11 reads program from the ROM 12, the HDD 13, and an external storage or memory such as the auxiliary storage 2, and reads and writes image data and various parameters. The ROM 12 and the HDD 13 store various data such as image data and parameters, and programs used for given processing. The network interface 14 can be used to connect with external apparatuses via the network 5, and used for inputting/outputting image data and parameters, and reading and distribution of programs.

Figure 3:
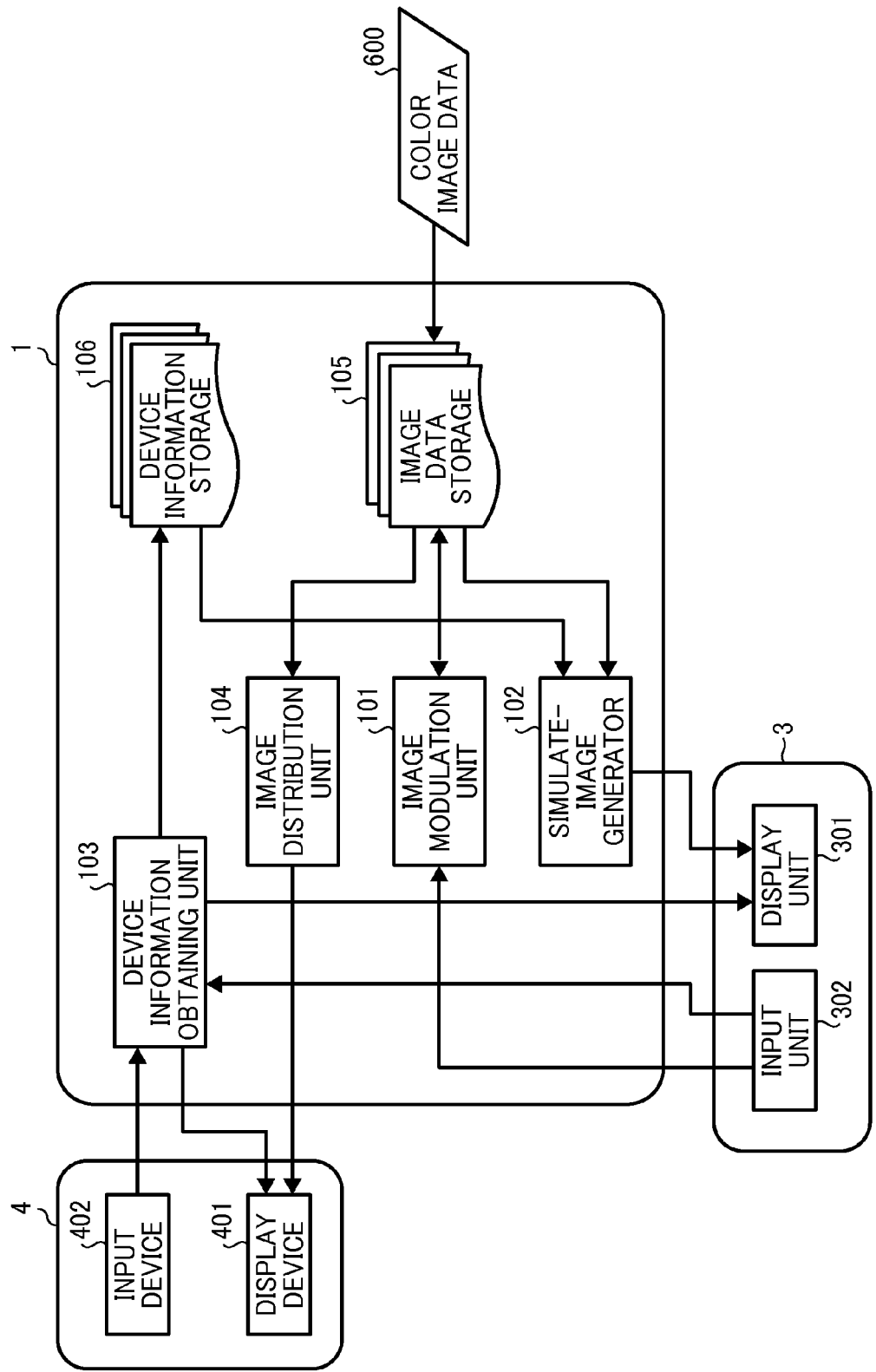
FIG. 3 shows an example of a functional block diagram of the image distribution system of FIG. 1.

A description is given of a functional block diagram of the image distribution system. FIG. 3 shows an example of a functional block diagram of the image distribution system of FIG. 1. The server 1 includes, for example, an image modulation unit 101, a simulate-image generator 102, a device information obtaining unit 103, an image distribution unit 104, an image data storage 105, and a device information storage 106. Further, the creator terminal device 3 includes, for example, a display unit 301, and an input unit 302 while the user terminal device 4 includes, for example, a display device 401, and an input device 402.

Figure 4:
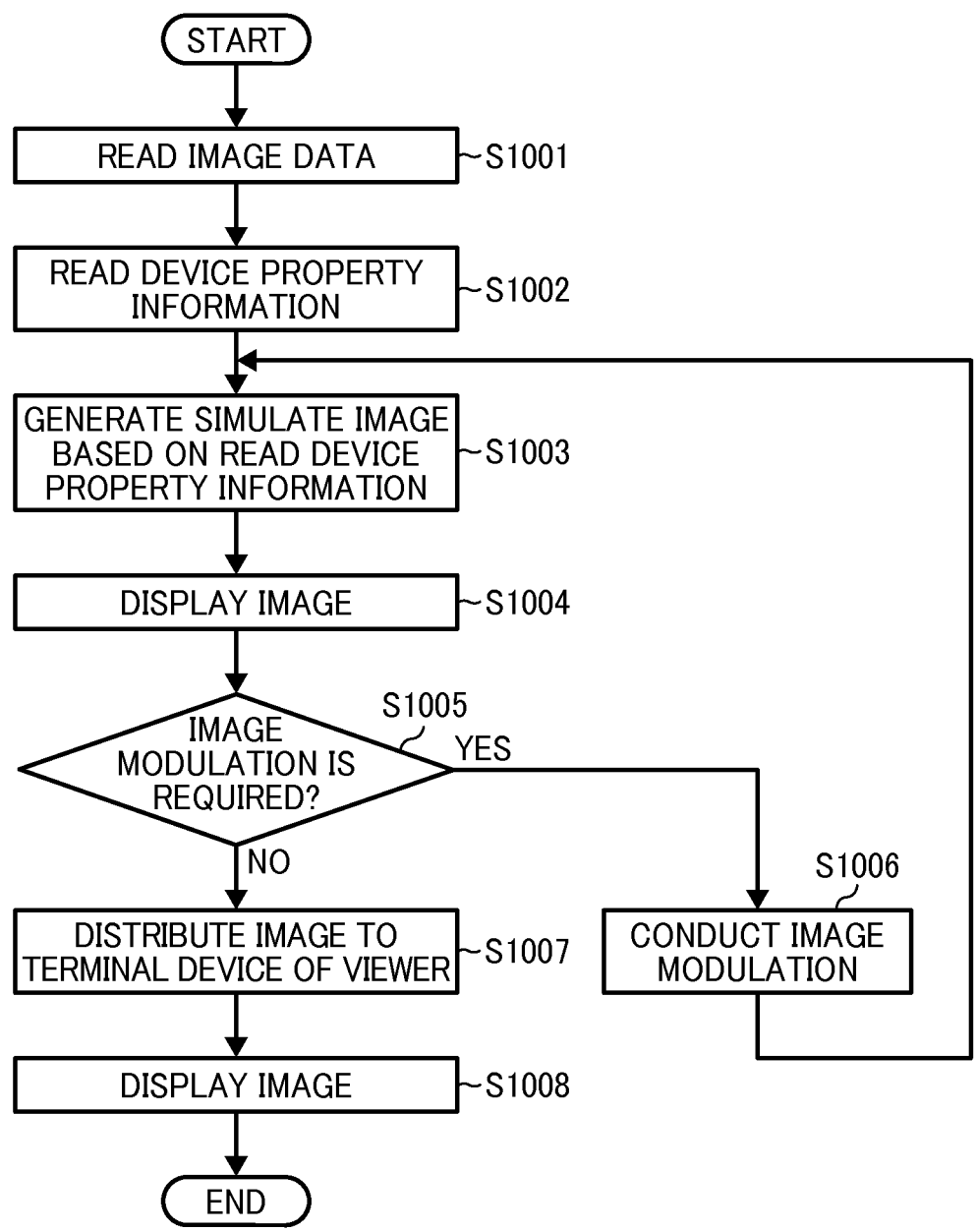
FIG. 4 shows a flowchart of steps of an operation of the image distribution system of FIG. 1.

A description is given of an operation of an image distribution system with reference to FIG. 4, which shows a flowchart of steps of an operation of the image distribution system shown in FIG. 1. When color image data 600 (FIG. 3) is input to the image data storage 105, the operation starts. The color image data 600 can be captured by an image-input device such as a digital camera, a scanner, or the like.

At first, the simulate-image generator 102 reads out image data stored in the image data storage 105 (step S1001). Then, the simulate-image generator 102 reads out device property information of the display device 401 of the user terminal device 4 from the device information storage 106 (step S1002). Such device property information can be obtained for each display device by using the device information obtaining unit 103 in advance.

Figure 5:
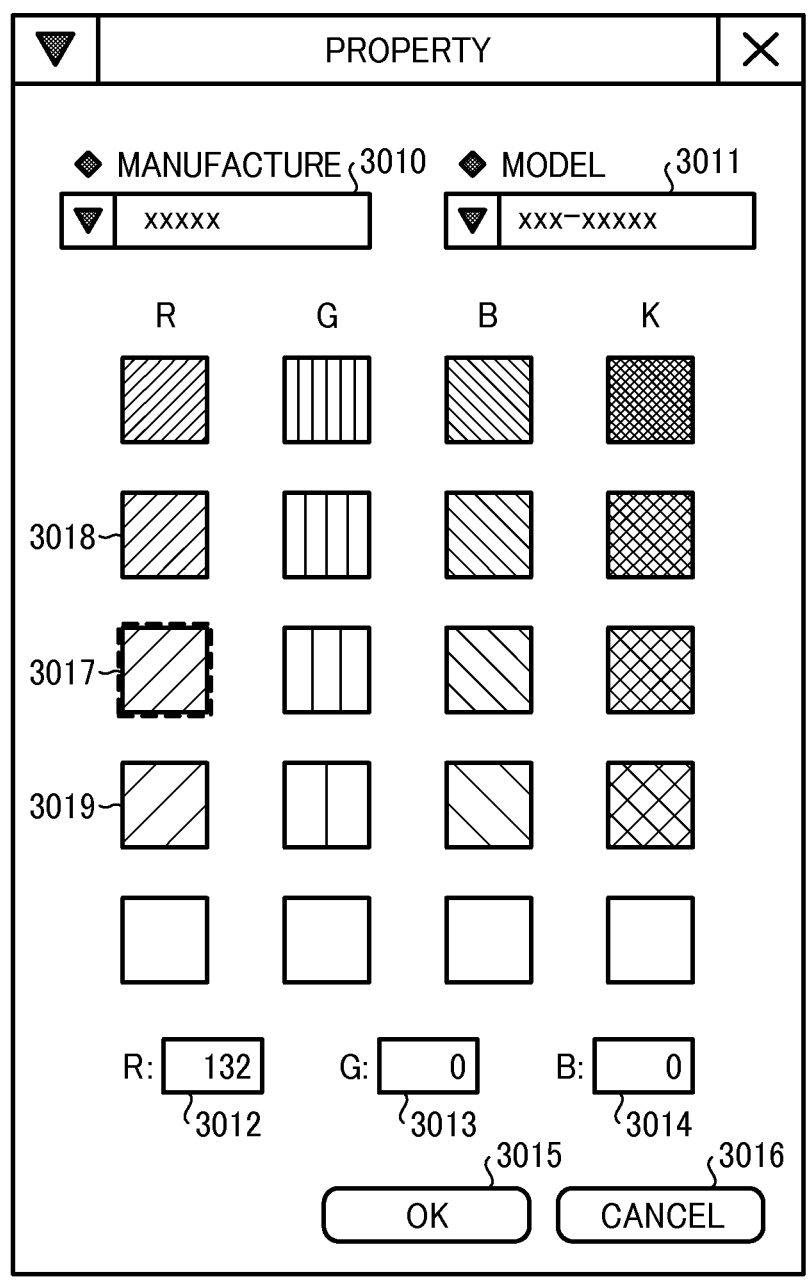
FIG. 5 shows an example screen used for obtaining device property information at the image modulation apparatus.

A description is given of a method of obtaining device property information with reference to FIG. 5, which shows an example screen used for obtaining device property information. In this example case, device property is obtained based on gamma property (input/output property) and gray balance of red (R), green (G), blue (B), and values of maximum luminance of each R, G, B signal, and white point. The device property information set for each display device can be obtained by inputting a manufacture's name and a model name of each display device, in which a user may input a manufacture's name and a model name of a specific device that he uses into a manufacture selection section 3010 and a model selection section 3011.

Gamma property of each color signal can be obtained by setting and adjusting a plurality of points in a range from the white point to maximum luminance with an equal interval. For example, in a case of R, to set equal interval between a plurality of points in a range from (0, 0, 0) to (255, 0, 0), G=B=0 is set and fixed, and then the value of R is changed for adjustment. In this example, three points set between the white point and maximum luminance are adjusted.

The color encircled by a frame 3017 is an adjustment target color, which is a currently selected for color adjustment. The color displayed on the screen can be changed by changing values input to the input areas 3012, 3013, 3014 of R, G, and B. For example, the value input to the input area 3012 is changed to adjust the appearance of color encircled by the frame 3017 between the color appearance of frame 3018 and the color appearance of frame 3019.

When (132, 0, 0) are input as values of R, G, B as shown FIG. 5 and if the color appearance encircled by the frame 3017 is closer to the color appearance of 3018, the value of R is decreased to set the color appearance encircled by the frame 3017 closer to the color appearance of the frame 3019. If the color appearance encircled by the frame 3017 is closer to the color appearance of the frame 3019, the value of R is increased to set the color appearance encircled by the frame 3017 closer to the color appearance of the frame 3018. By adjusting values by decreasing or increasing as such, the color appearance of the frame 3017 can be set between the color appearance of the frame 3018 and the color appearance of the frame 3019. Upon adjusting the color appearance as such, an OK button 3015 is pressed to determine a value of the color encircled by the frame 3017. If the cancel button 3016 is pressed, the ongoing adjustment is suspended or stopped.

Figure 6:
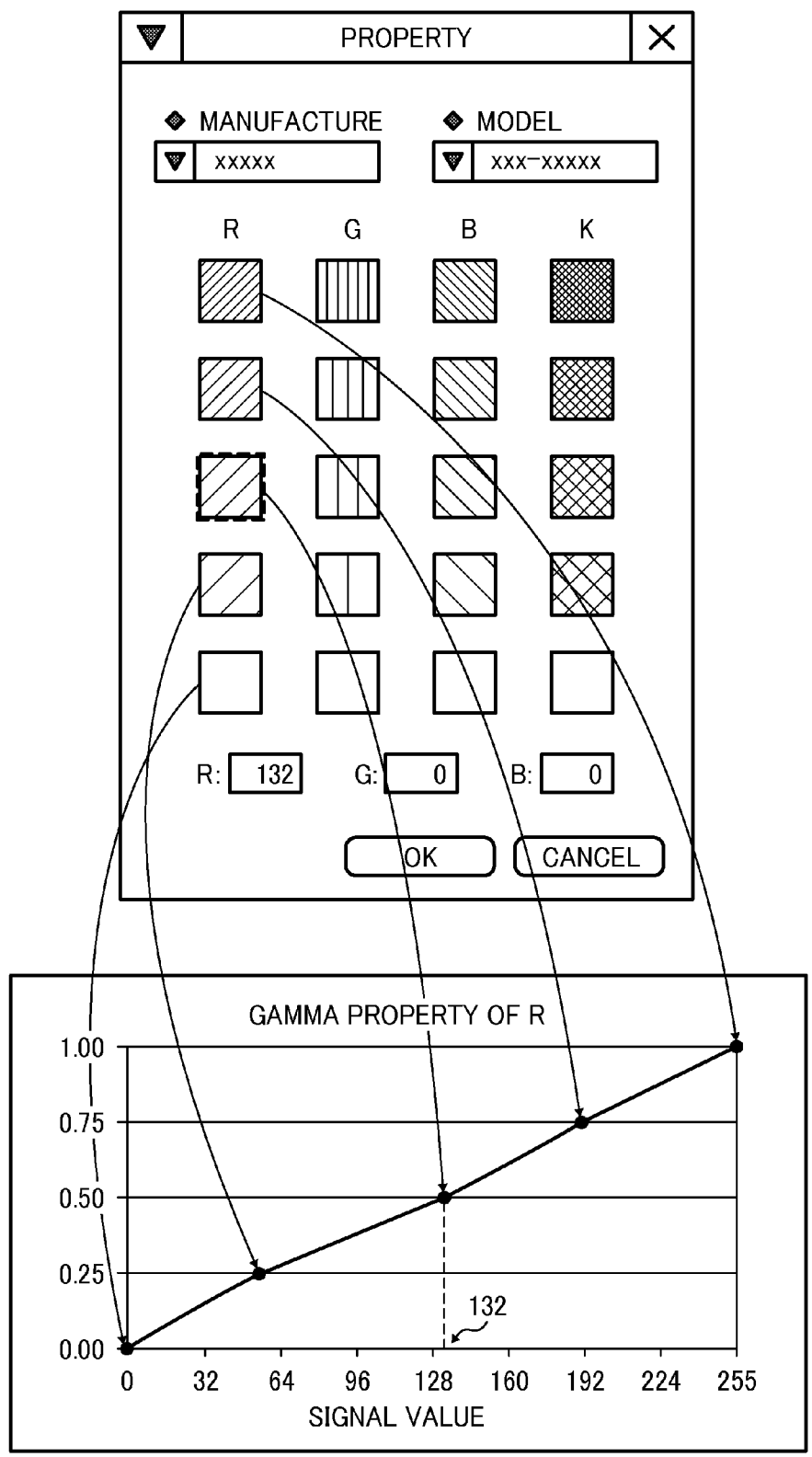
FIG. 6 shows a graph of gamma property prepared by converting signals obtained by using a screen of device property information of FIG. 5.

FIG. 6 is a graph showing an example of gamma property, which is obtained by converting signals, obtained by using the device property information obtaining screen (FIG. 5), to gamma property. In this graph, the horizontal axis represents values of signals, and the vertical axis represents the output level corresponding to the values of signals, and the white point is set with an output level 0, and the highest luminance is set with an output level 1. Because each point is set with an equal interval, when three points are set as shown in FIG. 5, each of the output levels of points are set to 0.25, 0.5, and 0.75. Based on such adjustment, signal values corresponding to the output levels can be obtained, and then gamma property can be obtained.

The color appearance of G and B can be adjusted similar to R. After adjusting the color appearance of R, G, and B, signals of R, G, and B having the same output level are set and added to prepare a start-color. Then, signal values of R, G, and B are adjusted to set the start-color to as a neutral color to obtain gray balance property. When adjusting the gray balance, the adjustment sequence of signals is from B to R to G in view of effect of each color to luminance.

Further, the value of the maximum luminance of each signal and white point can be obtained based on display device specification that can be defined based on the manufacture names and model names. Such values can be obtained from websites of manufactures when step S1002 is conducted or before conducting step S1002, and can be stored in the device information storage 106.

Programs for such adjustment process can be provided by the device information obtaining unit 103, and can be displayed on the display unit 301 of the creator terminal device 3, and on the display device 401 of the user terminal device 4. Further, the adjustment result is transmitted from the input unit 302 of the creator terminal device 3 and/or the input device 402 of the user terminal device 4 to the device information obtaining unit 103, and stored in the device information storage 106.

The above-described method is one method of obtaining device property information, and other known methods can be used to obtain device property information. For example, a method of obtaining device property information by adjusting color patches displayed on a display device to match with the color chart output in advance can be used, and a method of obtaining device property information by reading color patches displayed on a display device using a camera and a sensor can be used.

Referring back to FIG. 4, after step S1002, based on the read image data and the device property information, the simulate-image generator 102 generates a simulated image for a specific display device having specific property (step S1003). The simulated image can be generated or simulated using known technologies. For example, a method of conducting color matching using input color property information, color property information of the display device, and standard color space property information to generate a modulation image can be used. When such technology is applied, based on device property information of the user terminal devices 4a, 4b, 4c and image data, color signals are converted to standard color signal such as CIEXYZ and CIELab not dependent on devices. Based on device property information of the display unit 301 of the creator terminal device 3, such standard color signal can be converted to a signal suitable for a specific display device to generate a simulated image for the specific display device.

Then, the simulate-image generator 102 transmits the generated simulated image to the display unit 301 of the creator terminal device 3, wherein the display unit 301 displays an image modulation operation screen including the simulated image (step S1004).

Then, the image modulation unit 101 determines whether an image modulation operation is required (step S1005). Specifically, the creator checks the simulated image displayed on the image modulation operation screen displayed on the display unit 301 and determines whether the image modulation operation is required to be executed (step S1005).

If it is determined that the image modulation operation is required (step S1005:YES), the image modulation unit 101 conducts the image modulation operation (step S1006), in which the image modulation operation is conducted for an original image. Based on the modulated image, a simulated image is generated by conducting a simulation for the specific display device again (step S1003), and the simulated image is displayed (step S1004). Steps S1003 to S1006 are repeated until the image appearance can be set to a preferable level.

Figure 7:
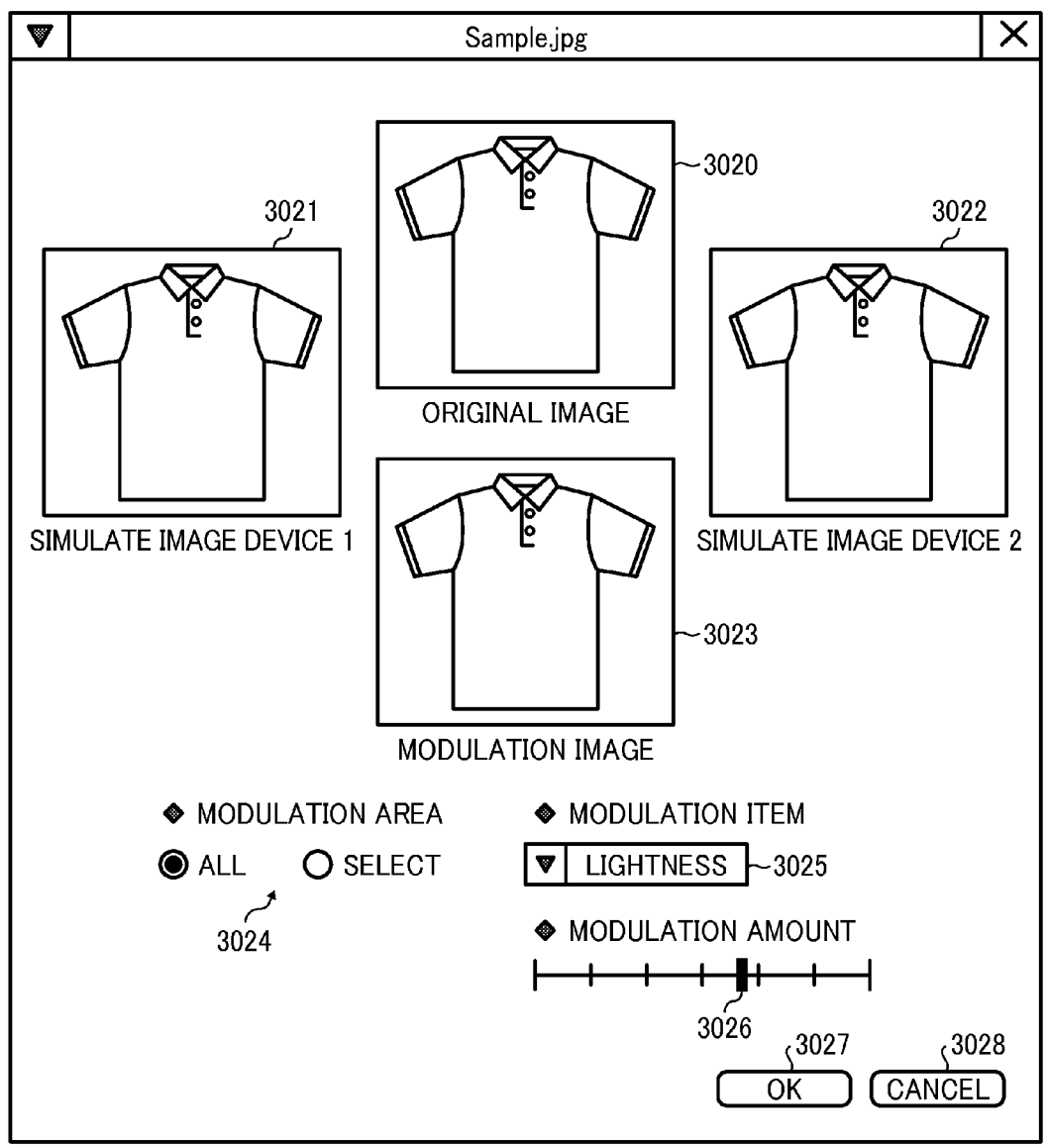
FIG. 7 shows an example of an image modulation operation screen for the image distribution system of FIG. 1.

A description is given of the image modulation operation screen with reference to FIG. 7, which shows an example of the image modulation operation screen. The image modulation operation screen includes, for example, display areas 3020, 3021, 3022, and 3023 arranged as shown in FIG. 7. The display area 3020 displays an original image. The display area 3021 displays a simulated image simulated for a first device (Device 1). The display area 3022 displays a simulated image simulated for a second device (Device 2). The display area 3023 displays a modulation image.

The original image is a color image displayed using color image data read at step S1001. The simulated image of the first device (Device 1) is an image generated based on the original image and device property information of the first device (Device 1). Therefore, the simulated image of the first device (Device 1) shows an image appearance how the original image can be seen on the first device (Device 1). The simulated image of the second device (Device 2) is an image generated based on the original image and device property information of the second device (Device 2). Therefore, the simulated image of the second device (Device 2) shows an image appearance how the original image can be seen on the second device (Device 2). The modulation image is an image generated by conducting modulation or correction to the original image such as modulation for lightness, chroma, and saturation.

The first device (Device 1) and the second device (Device 2) are examples of the display devices 401 of the user terminal devices 4a, 4b, 4c. As such, a plurality of devices such as two devices can be selected when one image modulation operation is conducted. A method of selecting devices will be described later.

Further, the image modulation operation screen includes, for example, a radio button 3024, an input area 3025, a slider 3026, an OK button 3027, and a cancel button 3028 arranged in a given pattern. The radio button 3024 is used to select a modulation area of image. The input area 3025 is used to input information for selecting modulation items. The slider 3026 is used to select an image modulation amount. The OK button 3027 is used to enter the selected item and information. The cancel button 3028 is used to cancel the selected item and information.

As shown in FIG. 7, the image modulation operation screen can display the original image, the simulated image, and the modulation image concurrently. The creator can compare such displayed images, and determines which area, which element, and what level are required to be modulated. For example, the modulation area may be selected as an entire area or a partial area of image. If the partial area is selected, such area can be defined by color and/or area.

Further, the modulation items may be general modulation items such as lightness, chroma or saturation, hue, contrast, and color balance. If the image modulation amount is changed (step S1005:YES), the modulation image changes in real time (step S1006), and simultaneously the simulated image is generated again (step S1003) and also displayed in real time (step S1004). The image modulation unit 101 stores the modulation image in the image data storage 105.

It should be noted that a user such as a creator can check images changed in real time, in which the modulation image and the simulated image are compared with the original image, and the image modulation is conducted so that image appearance of the modulation image and the simulated image can be set without oddness feeling compared to the original image. As such, the image modulation can be conducted by checking and confirming the modulation image and each of the simulated images. The above-described modulation methods and interfaces are merely examples, and other methods and interfaces can be used as required.

Upon completing the image modulation operation (step S1005:NO), the image distribution unit 104 retrieves an image from the image data storage 105 in response to a user viewing request, and distributes the retrieved image to the user terminal device 4 (step S1007). The distributed image is then displayed on the display device 401 of the user terminal device 4 (step S1008).

If it is determined that the image modulation is not required from the beginning at step S1005, the image modulation operation is not conducted, and then steps S1007 and S1008 are conducted, and then an image is displayed on the user terminal device 4.

A description is given of selection of devices displayed on the image modulation operation screen. In this disclosure, a distribution system is configured, for example, with user terminal devices 4a, 4b, 4c, and the display devices are selected, for example, two (2) display devices are selected for one image modulation operation. For example, the display devices 401 of the user terminal devices 4a and 4b are selected for the first image modulation operation, and the image modulation operation is conducted if required. Then, the display device 401 of the user terminal devices 4c is selected for the second image modulation operation, and the image modulation is conducted if required.

If the numbers of the user terminal device 4 is three as shown in FIG. 1, the image modulation operation ends as such. When a number of the user terminal devices 4 are disposed on the network 5, for example, two devices are selected for one image modulation operation and the image modulation operation is conducted if required, and such selection and modulation are repeated for all of the user terminal devices 4.

As such, the simulated images corresponding to all of the user terminal devices 4 can be displayed sequentially. For example, when modulating lightness, the original image is modulated to a modulated image in a way that a display device having the highest lightness is modulated to reduce lightness and a display device having the lowest lightness is modulated to increase lightness. By distributing such modulated image to each one of the user terminal devices 4, a good level of image appearance can be displayed on any one of the user terminal devices 4.

As such, the modulated image, having a good level of image appearance on any one of display devices 401 of any one of the user terminal devices 4, can be generated at first. By conducting such process, an image conversion adapted to device property of each one of the display devices 401 is not required at each time a user viewing request is issued for each one of the display devices 401, by which the processing load of the server 1 can be reduced.

Second Example Embodiment

Figure 8:
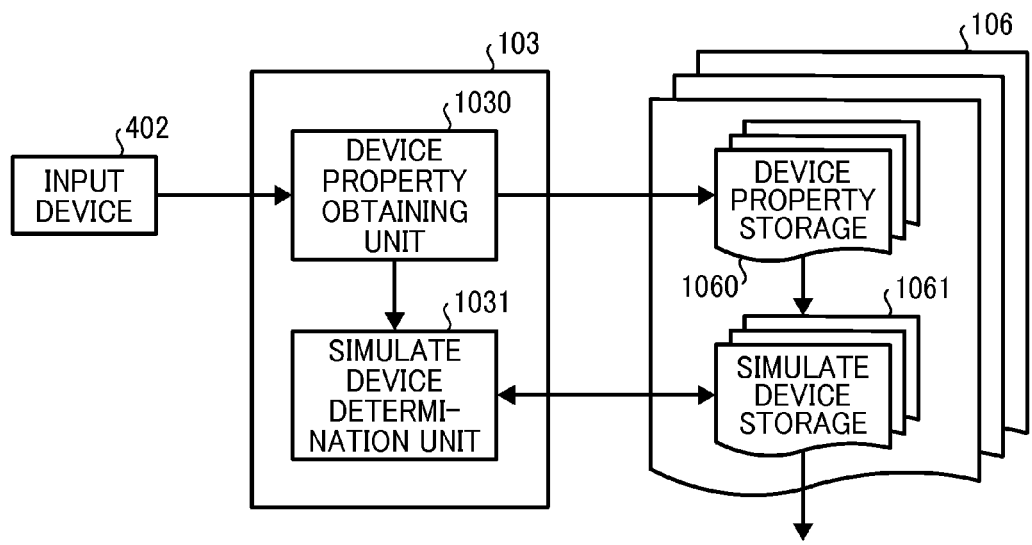
FIG. 8 shows an example of a functional block diagram of a device information obtaining unit and a device information storage of an image modulation apparatus according to a second example embodiment.
Figure 9:
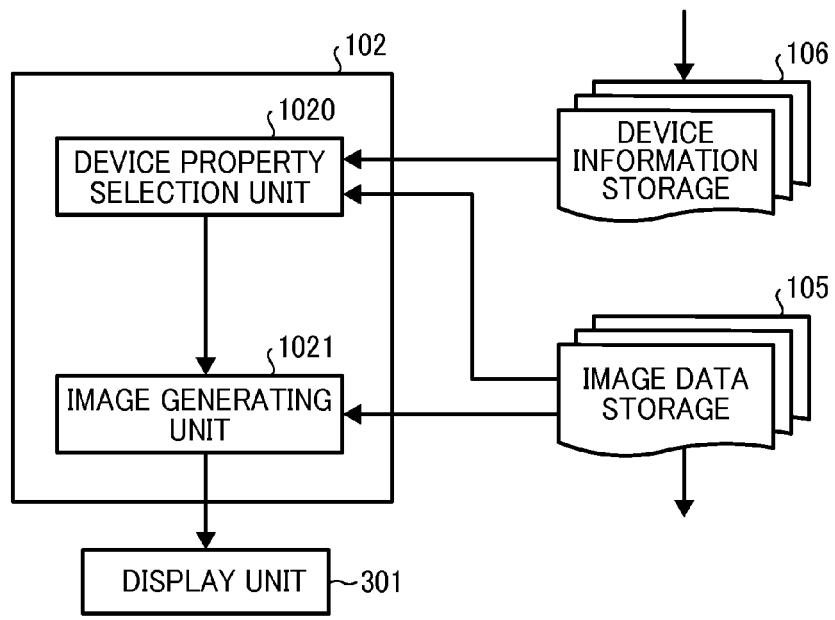
FIG. 9 shows an example of a functional block diagram of a simulated image generator of an image modulation apparatus according to the second example embodiment.

FIG. 8 shows an example of a functional block diagram of the device information obtaining unit 103 and the device information storage 106 of an image modulation apparatus according to a second example embodiment, and FIG. 9 shows an example of a functional block diagram of the simulate-image generator 102 of an image modulation apparatus according to the second example embodiment. In FIGS. 8 and 9, units corresponding to units in FIG. 3 have the same reference characters used in FIG. 3.

The overall functional block diagram and hardware block diagram of the image modulation apparatus and a configuration of the image distribution system including the image modulation apparatus according to the second example embodiment are almost same as the first example embodiment show in FIGS. 1, 2, and 3. When compared with the first example embodiment, in the second example embodiment, the simulate-image generator 102 has a function to select a simulation target device based on device property information of each of display devices.

As shown in FIG. 8, the device information obtaining unit 103 includes, for example, a device property obtaining unit 1030 and a simulate device determination unit 1031. The device information storage 106 includes, for example, a device property storage 1060 and a simulate device storage 1061. Further, as shown in FIG. 9, the simulate-image generator 102 includes, for example, a device property selection unit 1020 and an image generating unit 1021.

Figure 10:
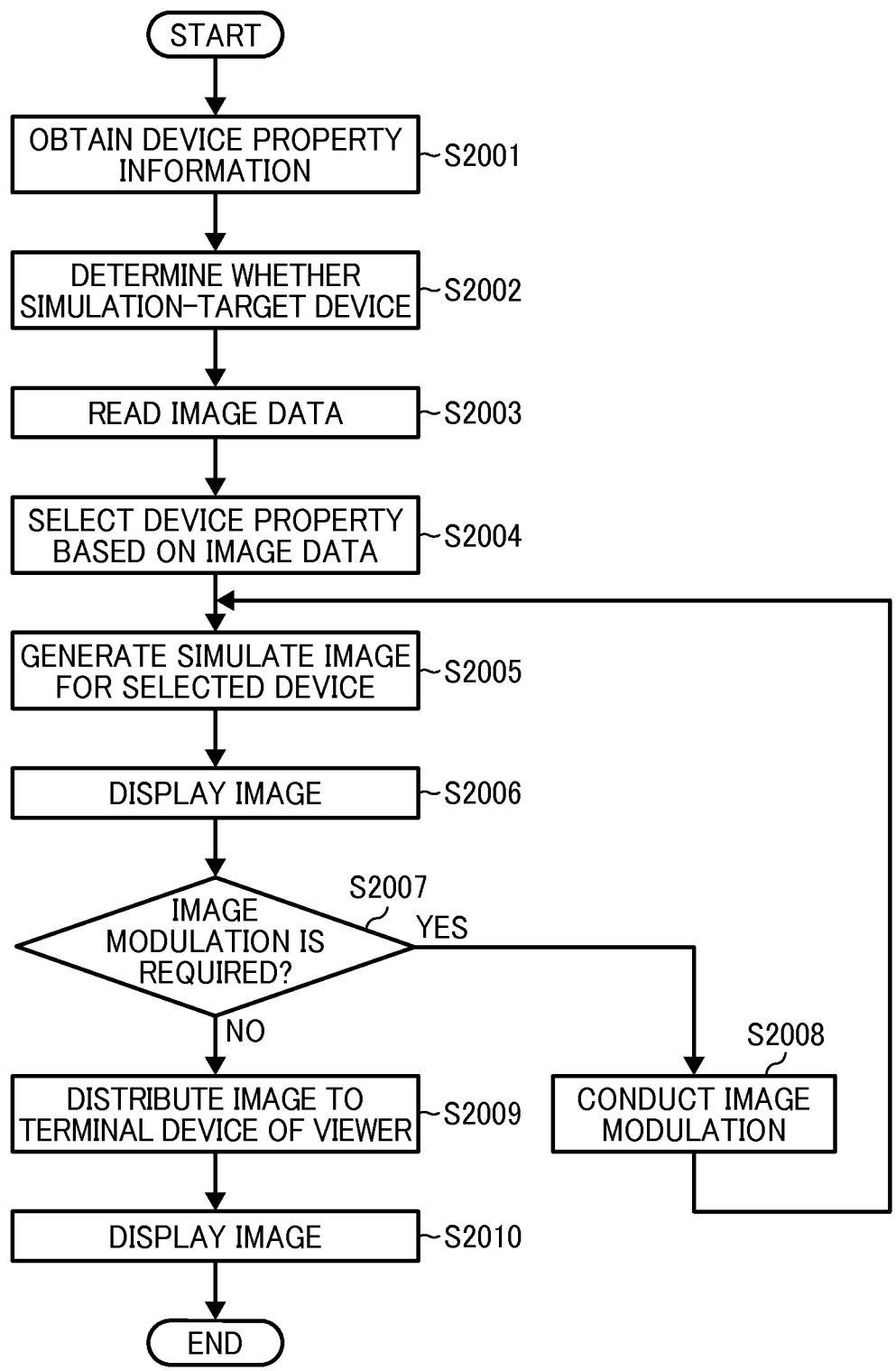
FIG. 10 shows a flowchart of steps of an operation of an image distribution system including an image modulation apparatus according to the second example embodiment.

FIG. 10 shows a flowchart of steps of an operation of an image distribution system including an image modulation apparatus according to the second example embodiment.

At first, the device property obtaining unit 1030 (FIG. 8) in the device information obtaining unit 103 obtains or reads out device property information of the display device 401 of each of the user terminal devices 4 from the device property storage 1060 (FIG. 8) in the device information storage 106 (step S2001).

Then, the simulate device determination unit 1031 (FIG. 8) in the device information obtaining unit 103 determines whether a specific display device is a simulation target device or not based on the obtained device property information (step S2002). As such, the simulate device determination unit 1031 can be used as a simulation target device selection unit. The simulate device determination unit 1031 that can be used as the simulation target device selection unit includes a computing unit and a determination unit. The computing unit computes difference between a standard color signal of device property information and a standard color signal of reference color. The determination unit determines that a display device having a maximum difference value computed by the computing unit as a simulation target device.

Figure 11A:
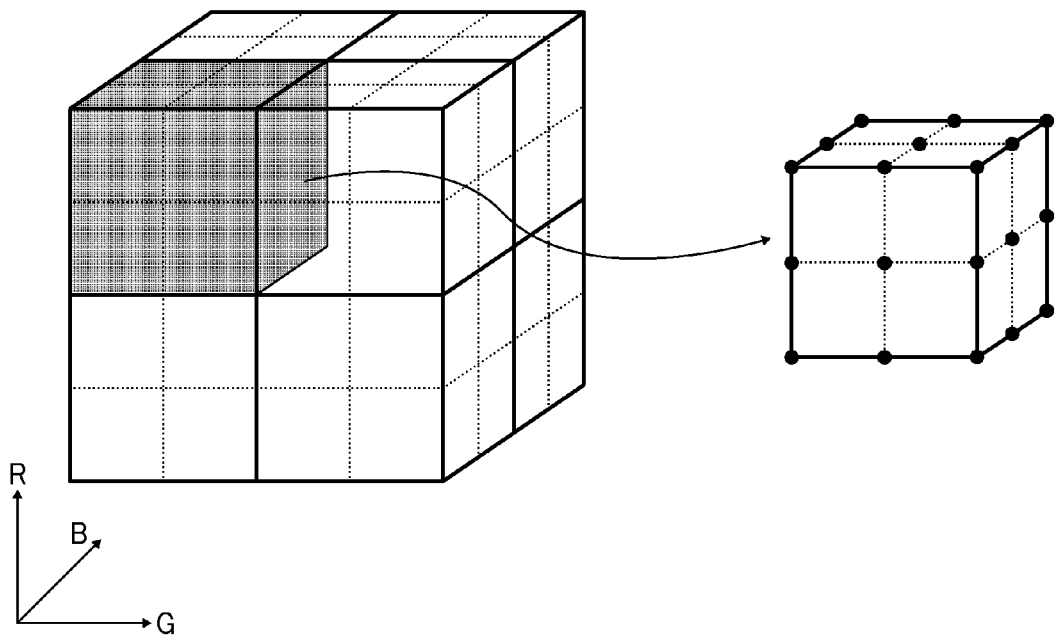
FIGS. 11A and 11B show a process conducted by an image modulation apparatus to determine whether a device is a simulation target device using RGB space according to the second example embodiment.
Figure 11B:
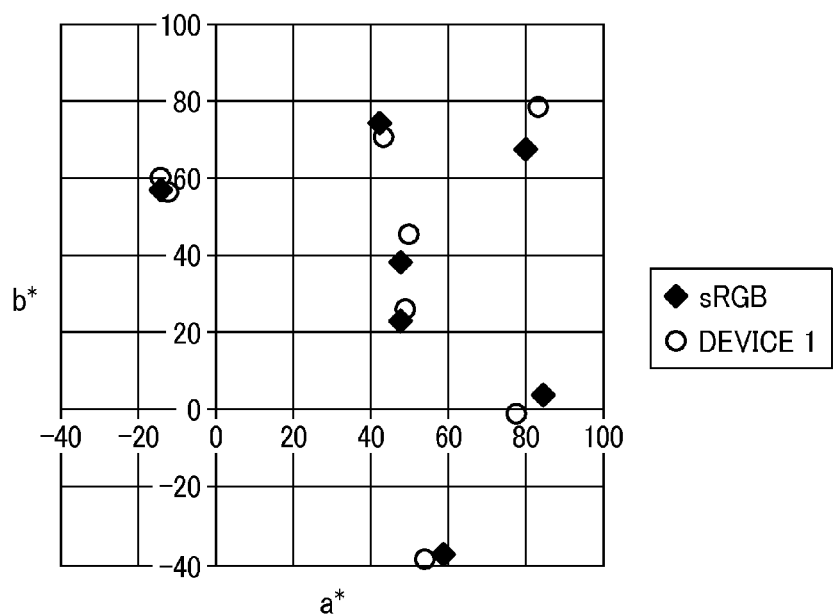

FIGS. 11A and 11B schematically show a method to determine whether a specific display device is a simulation target device using RGB space.

A list of simulation target device can be stored in the simulate device storage 1061 separately from each device property information. Such list can be obtained using methods described with reference to FIG. 5.

Whether a specific display device is a simulation target device or not can be determined by comparing signals of given color space. Specifically, a color space is divided in a plurality of areas. A standard color signal of representative color included in each area, and a standard color signal of reference color are compared to compute a difference of such signals. Then, it is determined whether the difference of such signals of one display device becomes a maximum value compared to other display devices, and if the difference of such signals of one display device becomes a maximum value, such one display device is determined as a simulation target device.

The standard color signal means color signal such as CIEXYZ, CIELab not depending on devices. The standard color signal of reference color means a value of international standard of color space such as sRGB and AdobeRGB to be used for matching color reproduction for display apparatuses or image capture devices such as personal computers, displays, cameras, or means given values set based on property of general display devices in advance.

The color space used for the above determination process is, for example, RGB space shown in FIG. 11A. When device property information is obtained by using a method used in the first example embodiment, display device profile can be prepared. The display device profile records a relationship of RGB and CIELab for feature points.

In FIG. 11A, cross points of lines (i.e., black dots) are feature points of representative color. The RGB space is divided into a plurality of areas having one or more feature points. In FIG. 11A, the RGB space is divided into two for each direction of R, G, B as shown by solid lines.

For each one of the divided areas, standard color signals of representative color, corresponding to each R, G, B at feature points included in the area, can be obtained from the display device profile, and compared with standard color signal of reference color in CIELab to compute the difference of lightness L, chroma C, and hue H.

FIG. 11B shows a display device profile of Device 1. In FIG. 11B, the horizontal axis represents a* of CIELab and the vertical axis represents b* of CIELab. Further, black diamond dots are dots plotting feature points of sRGB, used as standard color signal of reference color in CIELab space, and white dots are dots plotting feature points of RGB of Device 1 in CIELab space.

In this example case, the standard color signal of reference color uses sRGB. The standard color signal of reference color is a defined standard such as sRGB, AdobeRGB, or the like, and it is preferable to set standard color signal of reference color suitable for devices that device properties are obtained.

If the computed difference of lightness L, chroma C, and hue H are greater than stored values, the stored values can be re-rewritten with the computed value. With such processing, display device(s) having the maximum difference among other devices for each of lightness L, chroma C, and hue H can be selected as simulation target device(s), and each difference value is stored as simulation-target data.

Figure 12A:
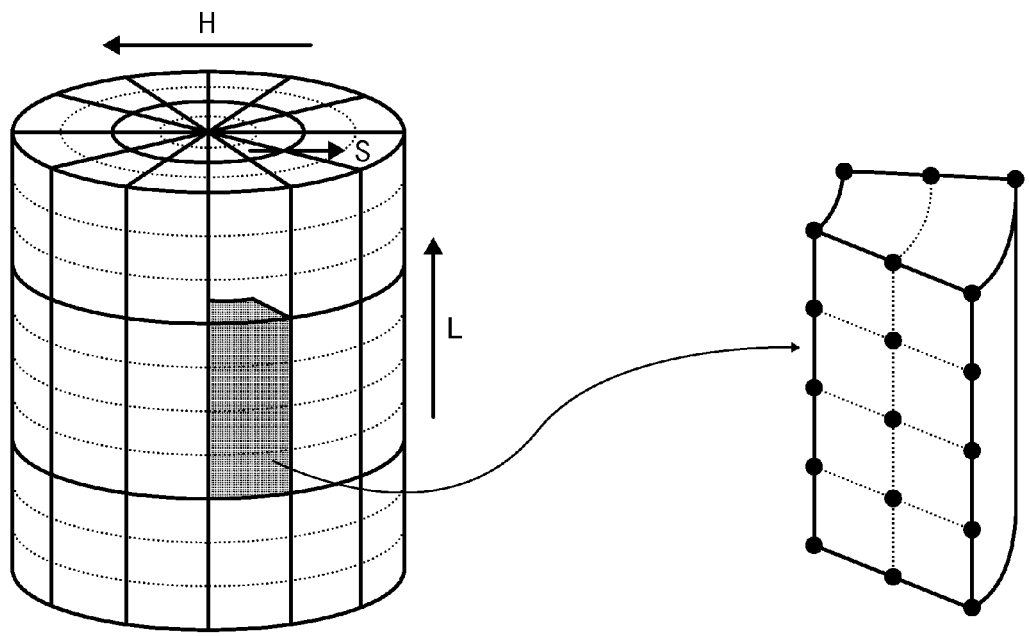
FIGS. 12A and 12B show a process conducted by an image modulation apparatus to determine whether a device is a simulation target device using HSL color space according to second example embodiment.
Figure 12B:
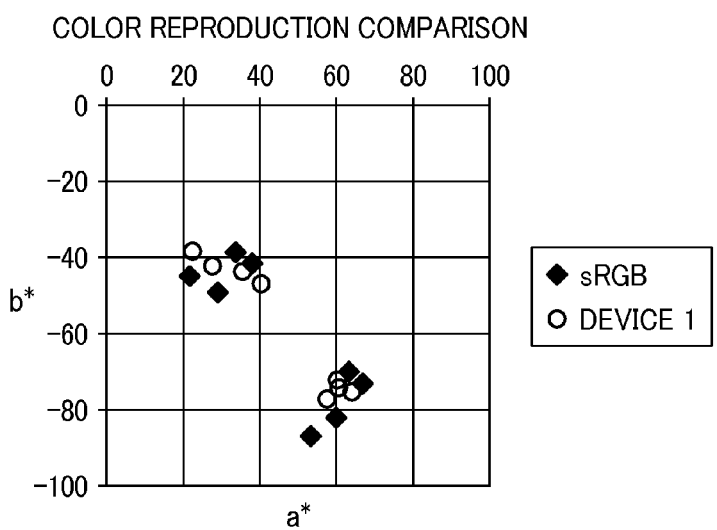

FIGS. 12A and 12B schematically show a method to determine whether a specific display device is a simulation target device using HSL space.

HSL space is a color space having lightness L, saturation S, and hue H. Similar to the RGB space, the HSL space is divided into a plurality of areas. In FIG. 12A, the HSL space is divided into three in L direction, two in S direction, and twelve in H direction as shown by solid lines, and the cross points of lines are used as feature points.

At first, standard color signals corresponding such feature points are obtained. The conversion between the RGB and HSL can be conducted using a conversion formula. Therefore, based on the relationship of RGB and CIELab recorded as the display device profile, the relationship of HSL and CIELab can be obtained. If RGB points corresponding to HSL points do not exist, surrounding points can be used for interpolation computations such as cubic interpolation, triangular pyramid interpolation, and tetrahedron interpolation.

FIG. 12B shows a display device profile of Device 1. In FIG. 12B, the horizontal axis represents a* of CIELab and the vertical axis represents b* of CIELab. Further, black diamond dots are dots plotting feature points of sRGB used as standard color signal of reference color in CIELab space, and white dots are dots plotting feature points of RGB of Device 1 in CIELab space.

Similar to the RGB space, based on the display device profile, the difference of lightness L, chroma C, and hue H are computed, and if the computed difference of lightness L, chroma C, and hue H are greater than stored values, the stored values can be re-rewritten with the computed values.

FIG. 13 shows an example of database that stores information of simulation target devices. For example, the database shows data configuration of simulation target device based on the HSL space. The database may be set in the simulate device storage 1061.

Information of simulation target devices is stored for each of area prepared by dividing the color space, in which information of simulation target devices is stored for lightness L, chroma C, and hue H with direction information such as positive and negative directions. In line with an example case of FIG. 12, FIG. 13 shows an example case having three (3) divisions for lightness L, two (2) divisions for chroma or saturation C, and twelve (12) divisions for hue H, and two (2) directions of positive and negative directions. Therefore, the total numbers of data becomes 3×2×12×2=144.

In FIG. 13, for example, an area of H=0, S=High, L=High is set at the top of table, in which as for ΔH (hue difference), device 3 (Dev3) is maximum in positive direction, and device 8 (Dev8) is maximum in negative direction; as for ΔC (chroma difference), device 3 (Dev3) is maximum in positive direction, and device 10 (Dev10) is maximum in negative direction; and as for ΔL (lightness difference), device 6 (Dev6) is maximum in positive direction, and device 15 (Dev15) is maximum in negative direction.

Such database storing simulation target devices stores only identifiers of devices, and device property information of devices are stored separately. The division numbers of color space can be changed based on demanded precision of selected devices and resource capacity of a server, or the like, as required.

Referring back to FIG. 10, upon determining whether a display device is a simulation target device at step S2002, the device property selection unit 1020 in the simulate-image generator 102 reads image data from the image data storage 105 (step S2003), and selects device property to be simulated based on the read image data (step S2004).

Figure 14:
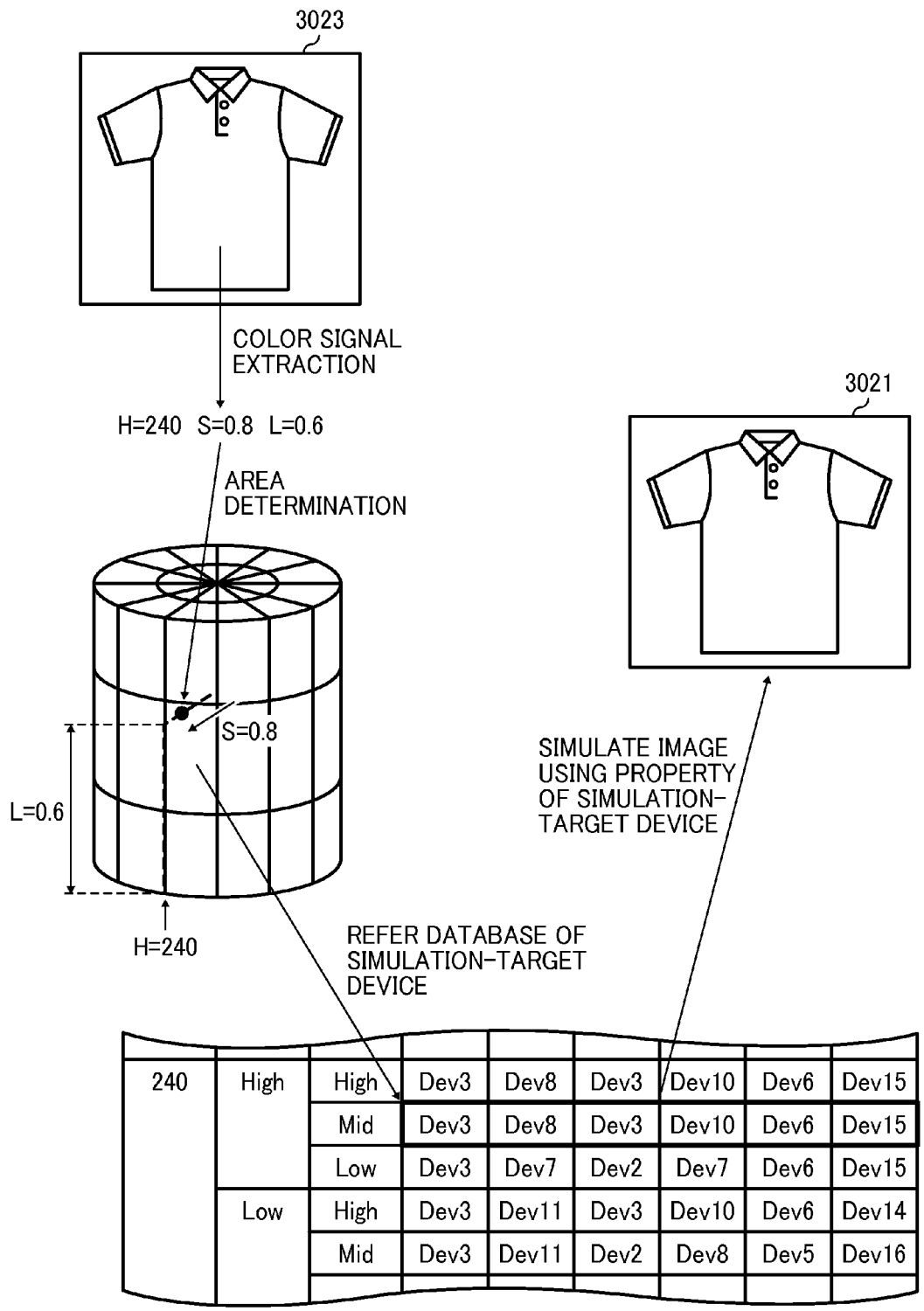
FIG. 14 shows a process of selection of a simulation target device and a process of displaying a simulated image at an image modulation apparatus according to the second example embodiment.

FIG. 14 show a process of selection of simulation target device and a process of displaying a simulated image.

At first, the creator selects color (i.e., modulation target color) from the original image displayed on the image modulation operation screen, and then such color signal is extracted. The extracted color signal is converted in view of color space used for determining a simulation-target data. In this case, the extracted color signal is converted to color signal of HSL space such as H=240, S=0.8, L=0.6.

The converted color signal is compared with the color space, and it is determined to which one area that the converted color signal belongs. Based on the determination result, device property information of a simulation target device is obtained from the database storing information of simulation target devices.

In an example case shown in FIG. 14, it is determined that device property information belongs to an area of H=240, S=High, L=Mid. The database storing information of simulation target devices includes following data for the area of H=240, S=High, L=Mid. As for ΔH, device 3 (Dev3) is maximum in positive direction, and device 8 (Dev8) is maximum in negative direction; as for ΔC, device 3 (Dev3) is maximum in positive direction, and device 10 (Dev10) is maximum in negative direction; and as for ΔL, device 6 (Dev6) is maximum in positive direction, and device 15 (Dev15) is maximum in negative direction.

As such, a plurality of device property information can be extracted. However, it is not required to simulate all devices. Depending on adjustment items and the intention or purpose of the creator, the simulated images of devices corresponding to ΔH, ΔC, ΔL can be displayed for each one of devices one by one, or displayed simultaneously for a plurality of devices, which can be switched freely.

Referring back to FIG. 10, based on such obtained device property information, the image generating unit 1021 generates a simulated image (step S2005). Subsequent steps S2006 to S2010 are the same as steps S1004 to S1008 of the first example embodiment (FIG. 4).

In the second example embodiment, based on image data, the image modulation apparatus conducts simulation only for a display device having greater color fluctuation. Therefore, even if a greater number of display devices is used such as a number of display devices are used for a net shopping, it is not required to conduct simulation for a number of display devices for image modulation, and a good level of image modulation can be conducted with less processing time for image modulation.

In the second example embodiment, for each one of H, S, L, one device having the maximum value in one direction and another device having the maximum value in another one direction can be selected from the database, and the simulated images for such two devices can be displayed on the image modulation operation screen. Because such two devices have the maximum values in opposite directions, other devices having values between such maximum values in opposite directions can be modulated at a good enough level if both of such two devices can be modulated at a good enough level. Such two devices can be selected from various devices conducting the previously described selection method of devices.

Third Example Embodiment

Figure 15:
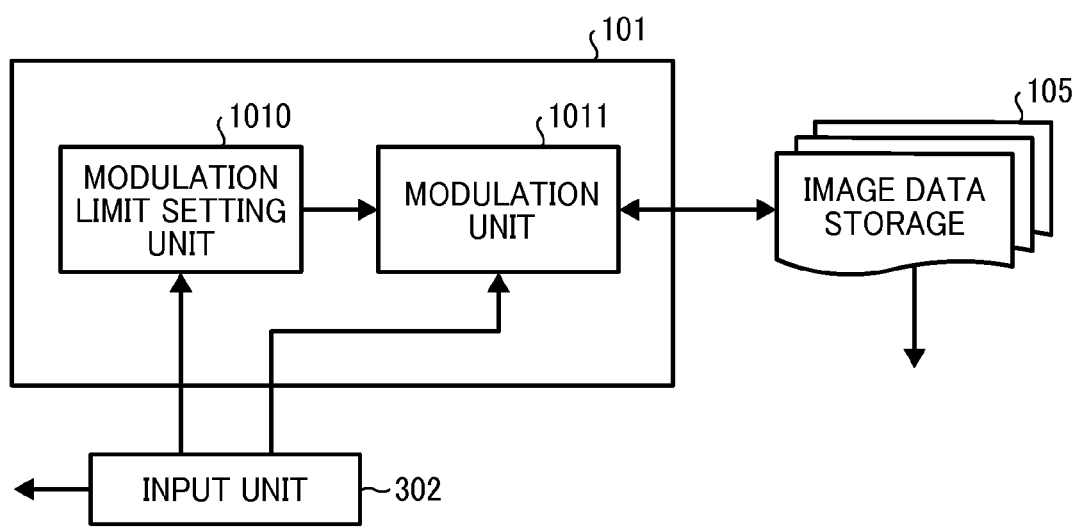
FIG. 15 shows an example of a functional block diagram of an image modulation unit at an image modulation apparatus according to a third example embodiment.

FIG. 15 shows an example of a functional block diagram of an image modulation apparatus having an image modulation unit of a third example embodiment. In FIG. 15, units corresponding to units in FIG. 3 have the same reference characters used in FIG. 3.

The overall functional block diagram and hardware block diagram of the image modulation apparatus and a configuration of the image distribution system including the image modulation apparatus according to the third example embodiment are almost same as the first example embodiment shown in FIGS. 1, 2, and 3.

In the third example embodiment, as shown in FIG. 15, the image modulation unit 101 includes, for example, a modulation limit setting unit 1010, and a modulation unit 1011. The modulation limit setting unit 1010 can set a limit on image modulation amount, by which it can prevent deviation of image appearance, such as too great deviation of image appearance, of modulated image modulated by the modulation unit 1011 from the original image. As such, the modulation limit setting unit 1010 can set an allowable limit on image modulation amount.

Figure 16:
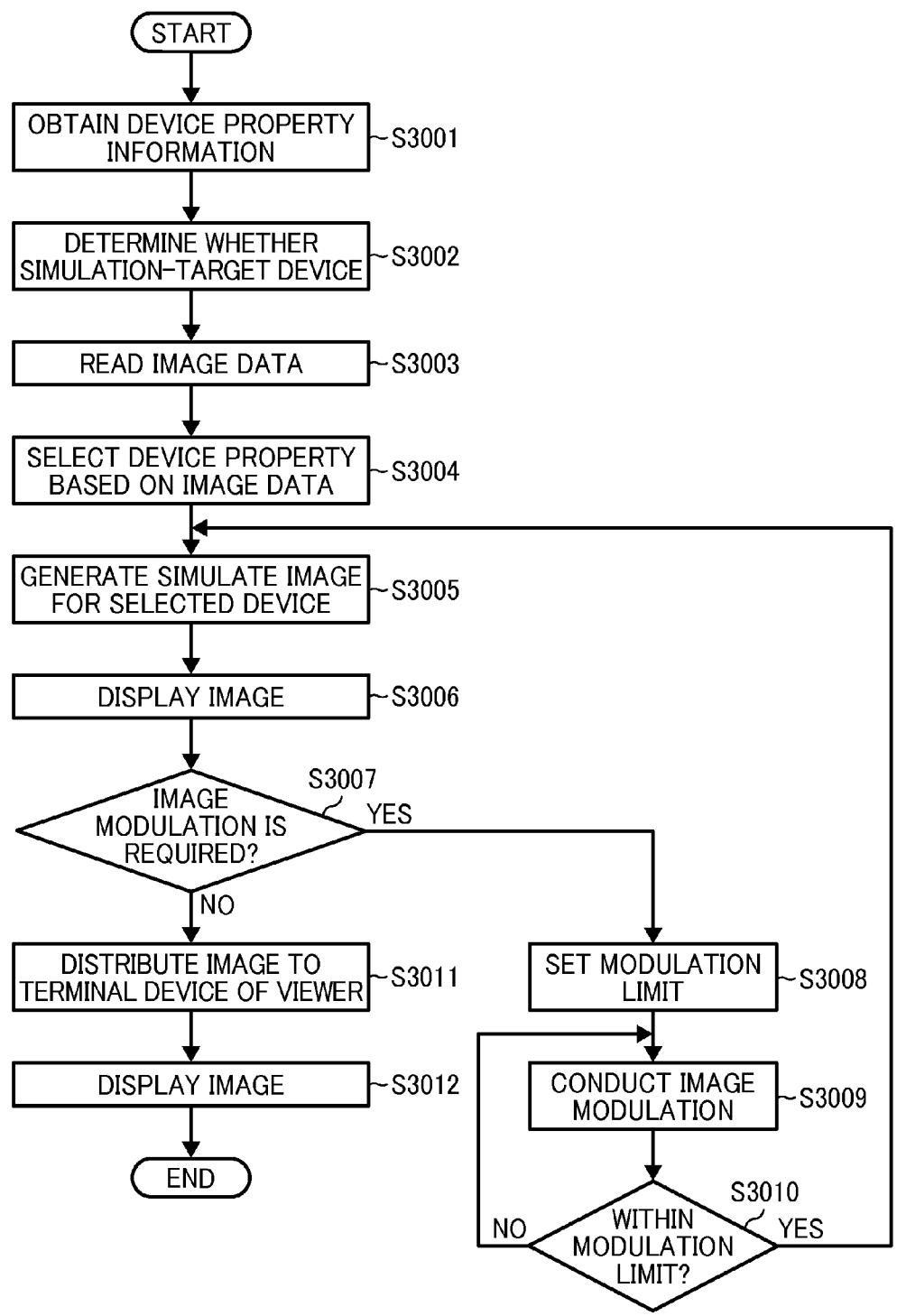
FIG. 16 shows a flowchart of steps of an operation of an image distribution system including an image modulation apparatus according to the third example embodiment.

FIG. 16 shows a flowchart of the operation of image distribution system having an image modulation apparatus of the third example embodiment.

Similar to steps S2001 to S2006 of FIG. 10 of the second example embodiment, at steps S3001 to S3006 in FIG. 16, based on the obtained device property information, device property information of a simulation target device is determined, and a simulated image for the simulation target device is generated and displayed.

Further, similar to step S2007 of FIG. 10, it is determined whether the image modulation operation is required at step S3007. If it is determined that image modulation operation is required (step S3007:YES), the modulation limit setting unit 1010 sets a modulation limit (step S3008).

The modulation limit is set to prevent excessive modulation. For example, the modulation limit is set for color difference $(\Delta E=\sqrt{[(\Delta L)^2+(\Delta a^*)^2+(\Delta b^*)^2]}$, lightness difference $(\Delta L)$, chroma difference $(\Delta C)$, and hue difference $(\Delta H)$.

Figure 17:
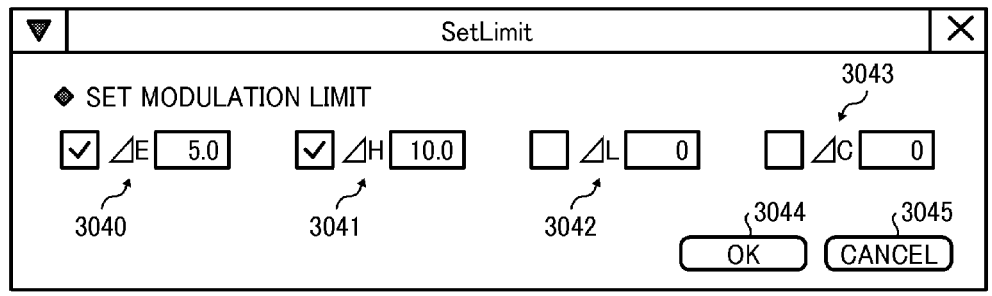
FIG. 17 shows an example of a modulation limit setting screen at an image modulation apparatus in an image distribution system according to the third example embodiment.

FIG. 17 shows an example of a modulation limit setting screen. The modulation limit setting screen displays a modulation limit setting section 3040 of $\Delta E$, a modulation limit setting section 3041 of $\Delta H$, a modulation limit setting section 3042 of $\Delta L$, a modulation limit setting section 3043 of $\Delta C$, an OK button 3044, and a cancel button 3045.

The modulation limit may not be required to set for all items, but can be set freely in view of image data. In an example case of FIG. 17, color difference is required to be adjusted within 5, and hue is required to adjusted within 10. Setting items are not limited to the above example items, but other items such as contrast can be added or deleted depending on apparatuses.

Referring back to FIG. 16, upon setting the modulation limit at step S3008, the modulation unit 1011 conducts an image modulation operation (step S3009), then the modulation unit 1011 determines whether the image modulation amount is within the modulation limit (step S3010).

Figure 18:
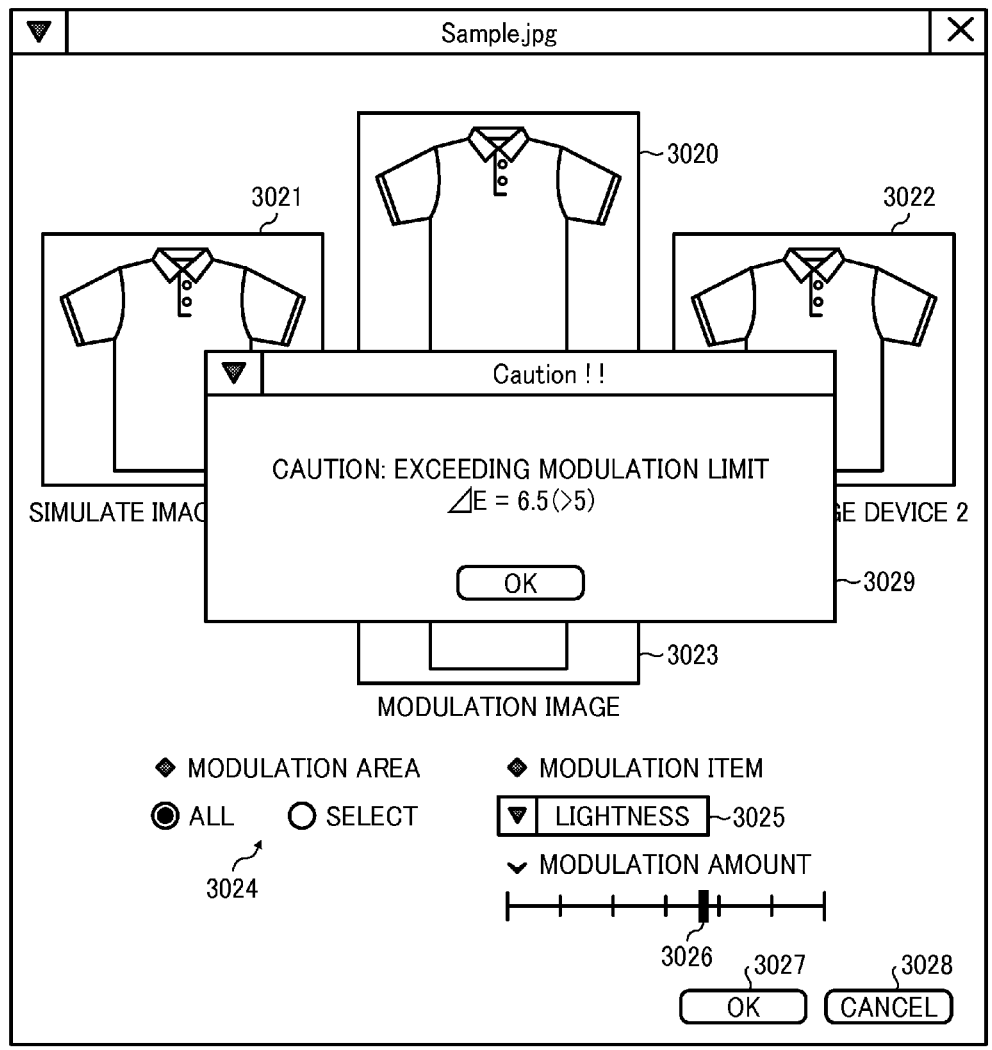
FIG. 18 shows an example of a caution display on an image modulation operation screen at the image modulation apparatus in the image distribution system according to the third example embodiment.

If it is determined that the image modulation amount exceeds the modulation limit (step S3010: NO), a caution image 3029 is displayed on the image modulation operation screen as shown in FIG. 18. The caution image 3029 reports the creator that the image modulation amount exceeds the modulation limit, and also reports the amount exceeding from the modulation limit. Based on such information, an image modulation may be conducted again (step S3009).

In contrast, if the image modulation amount is within the modulation limit (step S3010: YES), a simulated image is generated again using the modulated image data (step S3005) and is displayed (step S3006).

Steps S3005 to S3010 are repeated until the image appearance becomes a good enough level. Upon completing the image modulation, similar to the first and second example embodiments, the image is distributed to the user terminal device 4 (step S3011) and displayed on the display device 401 (step S3012).

As such, in the third example embodiment, by limiting the image modulation amount, it can prevent deviation, such as too much deviation, of modulated image from the original image.

Fourth Example Embodiment

Figure 19:
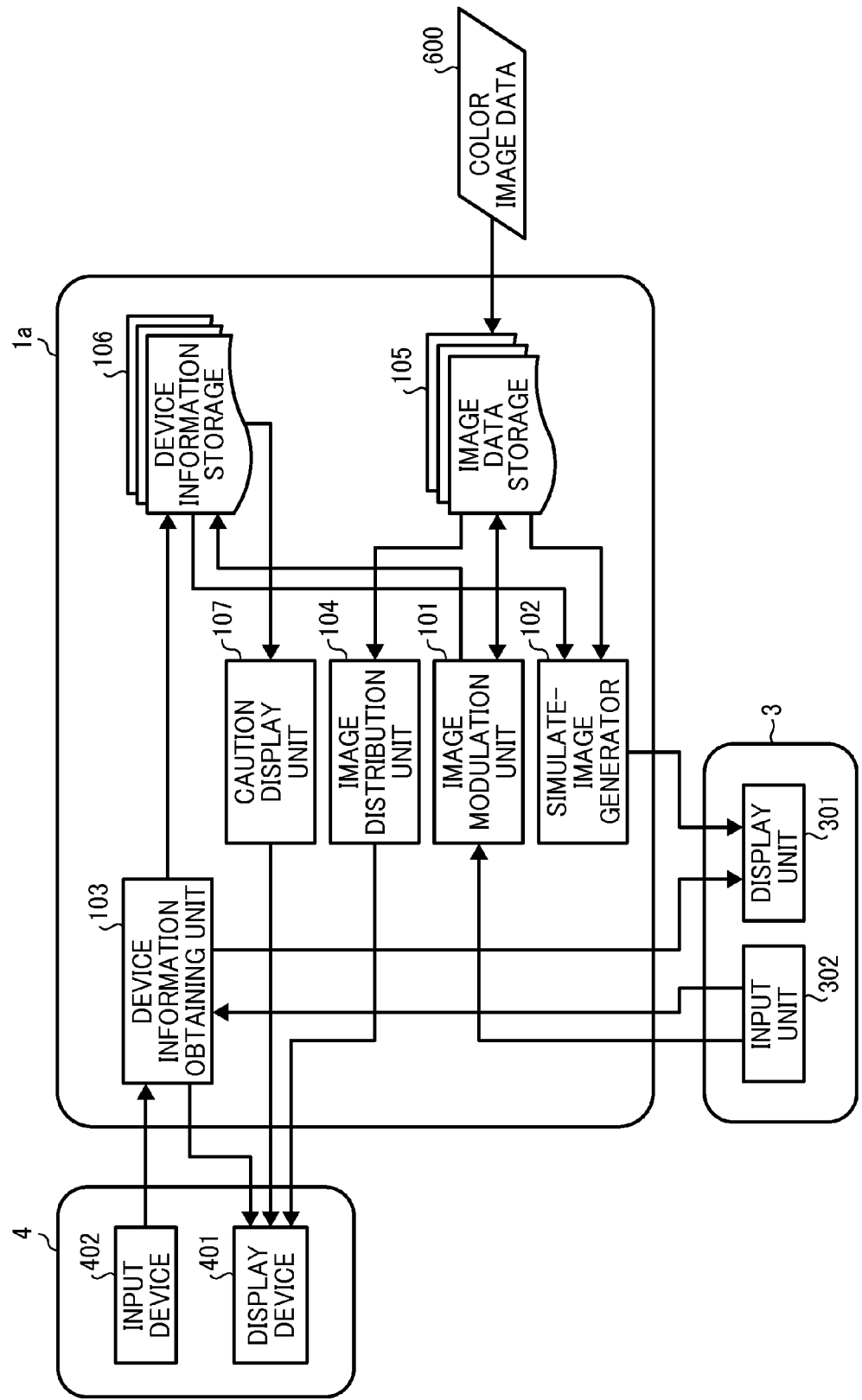
FIG. 19 shows an example of a functional block diagram of an image distribution system including an image modulation apparatus according to a fourth example embodiment.
Figure 20:
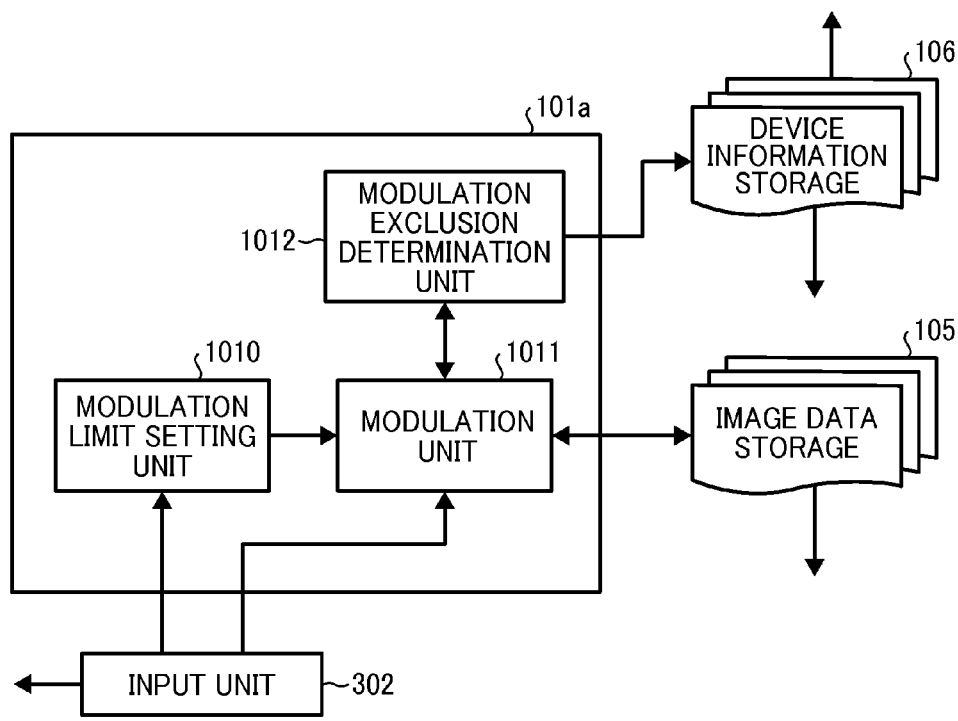
FIG. 20 shows an example of a functional block diagram of an image modulation unit of an image modulation apparatus according to the fourth example embodiment.

FIG. 19 shows an example of a functional block diagram of an image distribution system including an image modulation apparatus according to a fourth example embodiment, and FIG. 20 shows an example of a functional block diagram of an image modulation unit of an image modulation apparatus according to a fourth example embodiment. In FIGS. 19 and 20, units corresponding to units in FIGS. 3 and 15 have the same reference characters used in FIGS. 3 and 15.

In the fourth example embodiment, the modulation limit is set and a display device having a given level of problems can be identified. Specifically, when the modulation amount of a specific display device exceeds the modulation limit too many times repeatedly, the device property information of such specific display device can be deleted by the creator, and then excluded from a simulation target device. With such a configuration, a display device having extremely deviated property, or a malfunctioned display device can be excluded or deleted from an image modulation operation, by which processing resources such as processing time can be reduced, and the image modulation operation can be conducted efficiently and effectively.

As shown in FIG. 19, a server 1a of the fourth example embodiment used as the image modulation apparatus includes a caution display unit 107, which is added to the server 1 of FIG. 3 of the first example embodiment. Further, as shown in FIG. 20, an image modulation unit 101a of an image modulation apparatus of the fourth example embodiment includes a modulation exclusion determination unit 1012, which is added to the image modulation unit 101 of FIG. 15 of the third example embodiment.

Figure 21B:
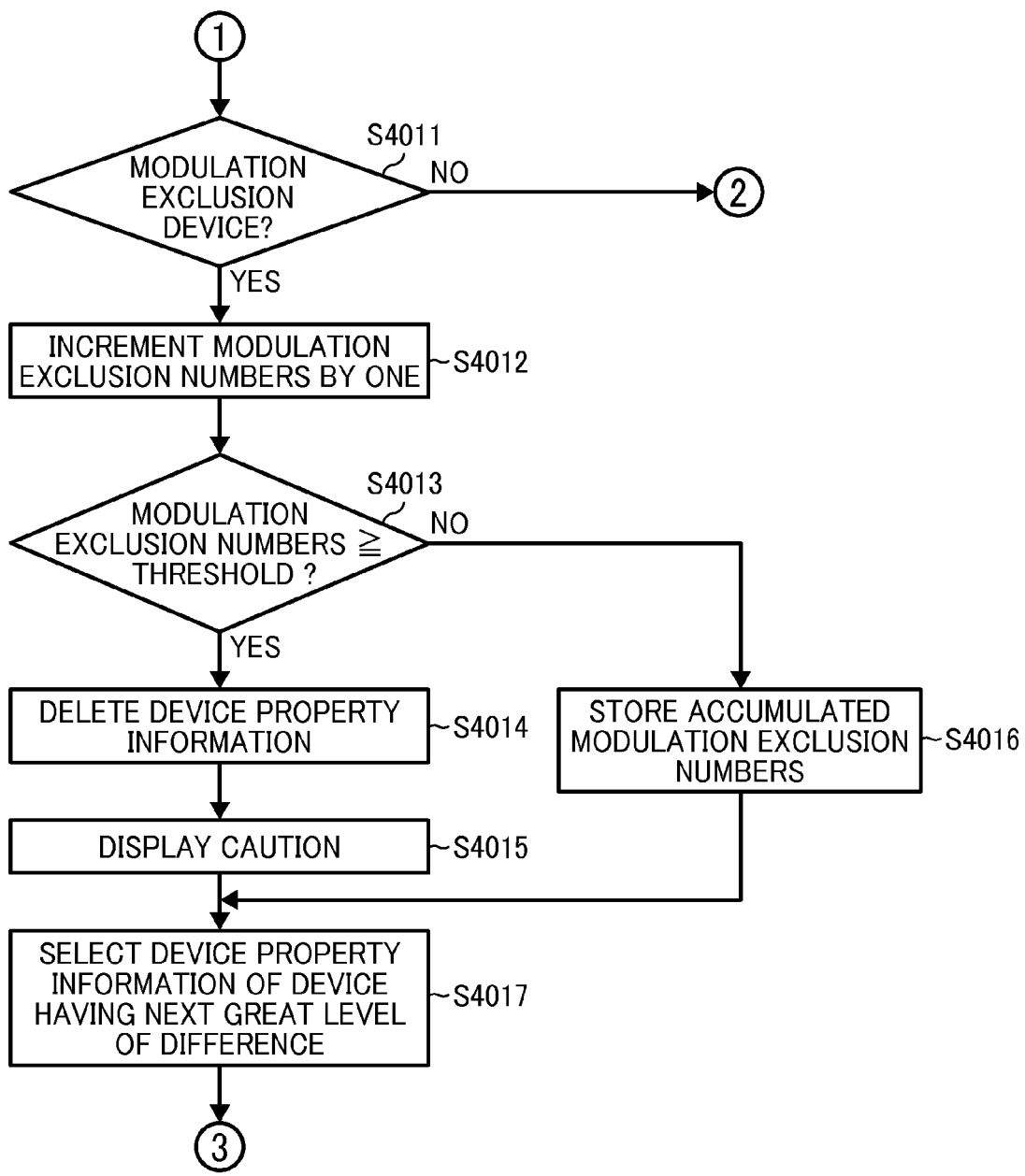

FIGS. 21A and 21B show a flowchart of steps of operation of image distribution system including the image modulation apparatus of the fourth example embodiment.

Steps S4001 to S4009 and steps S4018 and S4019 of FIGS. 21A and 21B are the same as steps S3001 to S3009 and steps S3011 and S3012 of FIG. 16 of the third example embodiment, and thereby the explanation of such steps is omitted.

Similar to step S3010 (FIG. 16), at step S4010, the modulation unit 1011 determines whether the image modulation amount is within the modulation limit. If it is determined that the image modulation amount is within the modulation limit (step S4010: YES), an image modulation operation is conducted again within the modulation limit similar to the third example embodiment. Steps S4005 to S4010 are repeated until the image appearance becomes a good enough level.

In contrast, if it is determined that the image modulation amount exceeds the modulation limit (step S4010: NO), the modulation exclusion determination unit 1012 determines whether a device simulated by the creator is a modulation exclusion device (step S4011).

If the difference between the original image and the simulated image is too great on the image modulation operation screen for a specific device, and if a good enough level of image appearance cannot be generated for other devices if an image modulation is conducted based on such specific device having too great difference between the original image and the simulated image, such specific device is determined as a modulation exclusion device, wherein the modulation exclusion device is a device that is excluded from an image modulation operation.

If the modulation exclusion determination unit 1012 determines that a specific device is not a modulation exclusion device (step S4011: NO), an image modulation operation is conducted again within the modulation limit (step S4009).

In contrast, if it is determined that that a specific device is a modulation exclusion device (step S4011: YES), the device information storage 106 increases the modulation exclusion numbers of the specific device, which may be one of simulation target devices, by one increment (step S4012). With such processing, the accumulated modulation exclusion numbers for the specific device can be stored in the device property storage 1060, which stores property of each device.

Then, the modulation exclusion determination unit 1012 determines whether the modulation exclusion numbers stored in the device information storage 106 is threshold or more (step S4013). Such threshold is used to determine whether a specific device has too much deviated property or has malfunctioned. Such threshold can be set or changed freely by manufactures or administrators of the image modulation apparatus.

If it is determined that the modulation exclusion numbers of a specific device is the threshold or more (step S4013: YES), the modulation exclusion determination unit 1012 deletes the device property information of such specific device stored in the device information storage 106 (step S4014). The caution display unit 107 displays a caution to report a user, who uses such specific device, that device property of such specific device is too much deviated or the device may be malfunctioned (step S4015).

If it is determined that the modulation exclusion numbers of a specific device is less than the threshold (step S4013: NO), the modulation exclusion determination unit 1012 stores the latest accumulated modulation exclusion numbers to the device information storage 106 (step S4016).

After step S4015 or step S4016, by excluding the specific device determined as a modulation exclusion device, a device having the second greatest difference after the determined modulation exclusion device is selected as a simulation target device from the device information storage 106 (step S4017), and the process returns to step S4005.

If it is determined that a specific device is the modulation exclusion device as such (step S4011:YES), such specific device may not have good compatibility with a specific image now being modulated by chance, and thereby the modulation amount cannot be set within the modulation limit. Therefore, if the accumulated modulation exclusion numbers is small (step S4013: NO), such device can be temporarily excluded only when the specific image is to be modulated (step S4017). If a specific device is determined as a modulation exclusion device for many times for various images (step S4013: YES), it can be determined that such specific device does not have good enough property, and then the device property information of such specific device can be deleted from the list shown in FIG. 13 (step S4014), and such specific device is excluded from the subsequent image modulation operation.

Figure 22:
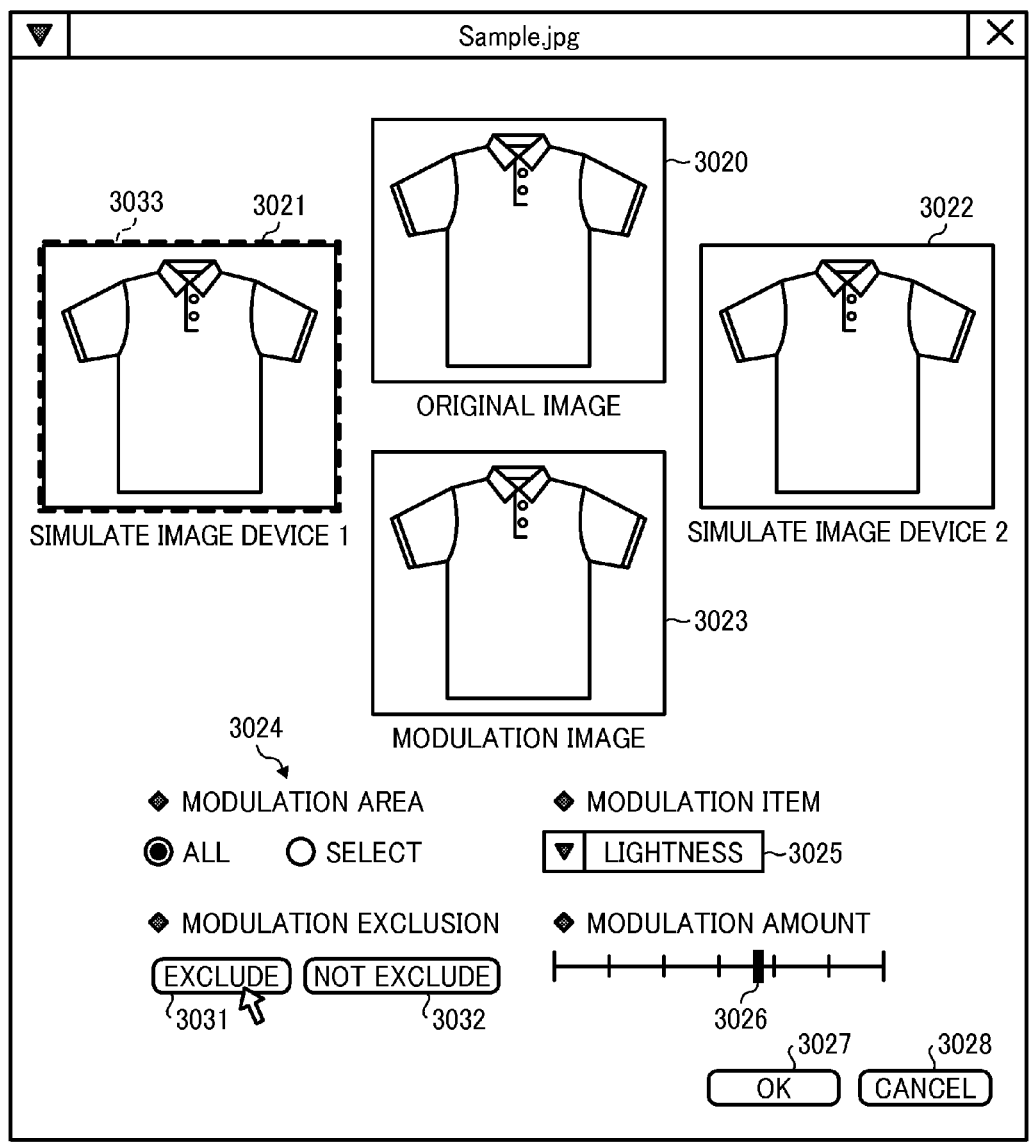
FIG. 22 shows an example of an image modulation operation screen at an image modulation apparatus in the image distribution system according to the fourth example embodiment.

FIG. 22 shows an image modulation operation screen displayed on the display unit 301 of the creator terminal device 3 of FIG. 19. In FIG. 22, same parts used in FIG. 7 have the same references.

As shown in FIG. 22, an outer frame 3033 is added to the simulated image of Device 1 so that the creator can determine whether such Device 1 is excluded from the modulation target. When the creator presses a button 3031, Device 1 is excluded from the modulation target, and when the creator presses a button 3032, Device 1 is not excluded from the modulation target.

Such image modulation operation screen is displayed when it is determined that a specific device is determined as a modulation exclusion device at step S4011 of FIG. 21 (step S4011: NO). If the creator presses the button 3031, proceed to step S4012, and if the creator presses the button 3032, proceed to step S4009.

In the image modulation apparatus of the fourth example embodiment, device property information of a specific display device, which is determined not suitable for image modulation for many times, can be excluded. With such a configuration, a display device having too much deviated property or a malfunctioned display device can be excluded from the image modulation operation, by which a user can reduce a workload when conducting the image modulation operation.

As above-described, the modulated image can be prepared by modulating the original image, and the simulated image can be prepared and displayed on a screen based on the modulated image and device property information of each display device. In the above-described example embodiments, one modulated image suitable used for each one of display devices can be prepared, in which such one modulated image is prepared by checking a plurality of displayed simulated images for a plurality display devices. For example, as above-described, one modulated image is prepared by checking two simulated images for two display devices so that the one modulated image can be modulated in a way that both of two simulated images have good level of image appearance. In such configuration, when an image modulation operation is conducted, the image appearance of two simulated images can be changed in line with the image modulation operation. Such image modulation operation can be completed when the image appearance of two simulated images are both set in allowable level.

As above-described, even if an image distribution destination apparatus such as a display device has no image conversion function corresponding to device properties, a good enough level of image appearance can be displayed at the display device without too much processing load at an image distribution originating apparatus such as a server.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited to these.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. In example embodiments, processing units, computing units, or controllers can be configured using various types of processors, circuits, or the like such as a programmed processor, a circuit, an application specific integrated circuit (ASIC), used singly or in combination.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image modulation apparatus, comprising:
a device information obtaining unit, using a processing device, to obtain device property information of a plurality of display devices respectively disposed at a plurality of image distribution destination apparatuses;
a simulated image generator, using the processing device, to generate a plurality of simulated images based on a distribution target image to be transmitted to each of the image distribution destination apparatuses and the device property information of each of the display devices obtained by the device information obtaining unit; and
a simulation target device selection unit, using the processing device, to select a display device from among the display devices based on device property information of each of the display devices as a simulation target device,
the plurality of simulated images being generated such that, when the plurality of simulated images are displayed on a first display device,
the plurality of simulated images simulate, on the first display device, appearances of the distribution target as if the distribution target is being displayed on the plurality of display devices, respectively; and
an image modulation unit, using the processing device, to modulate the distribution target image based on a modulation instruction received for the plurality of the simulated images simulated by the simulated image generator,
wherein the simulated image generator generates a simulated image for the simulation target device selected by the simulation target device selection unit,
wherein the simulation target device selection unit includes a computing unit and a determination unit, and
wherein the computing unit computes a difference between a standard color signal of the device property information and a standard color signal of a reference color, and the determination unit selects a display device having a maximum difference value computed by the computing unit as the simulation target device.

2. The image modulation apparatus of claim 1, wherein the determination unit determines whether a display device is a simulation target device for each area of a color space divided into a plurality of areas.

3. The image modulation apparatus of claim 2, wherein the simulated image generator includes a device property selection unit and an image generating unit,
wherein the device property selection unit determines an area of the color space to which a color signal included in the distribution target image belongs, in which each area of the color space is prepared by dividing the color space into the plurality of areas, and selects device property information of a simulation target device based on a determination result of area, and the image generating unit generates a simulated image based on the device property information selected by the device property selection unit.

4. The image modulation apparatus of claim 1, wherein the image modulation unit includes a modulation limit setting unit to set an allowable limit on image modulation, and a modulation unit to conduct color modulation within the allowable limit on image modulation.

5. The image modulation apparatus of claim 4, wherein the image modulation unit includes a modulation exclusion determination unit to exclude a specific display device from a modulation target device when a specific modulation condition used for the specific display device causes an unacceptable image appearance for other display devices.

6. A method of image modulation, comprising the steps of:
obtaining, at an image processing device, device property information of a plurality of display devices respectively disposed at a plurality of image distribution destination apparatuses;
generating, at the image processing device, a plurality of simulated images based on a distribution target image to be transmitted to each of the image distribution destination apparatuses and the device property information of each of the display devices obtained by the obtaining;
selecting a display device from among the display devices based on device property information of each of the display devices as a simulation target device,
the plurality of simulated images being generated such that, when the plurality of simulated images are displayed on a first display device, the plurality of simulated images simulate, on the first display device, appearances of the distribution target as if the distribution target is being displayed on the plurality of display devices, respectively;

causing a display of a plurality of simulated images generated by the simulating; and modulating the distribution target image based on a modulation instruction received for the plurality of the simulated images displayed by the displaying;

generating a simulated image for the simulation target device selected by the simulation target device selection unit;

computing a difference between a standard color signal of the device property information and a standard color signal of a reference color; and selecting a display device having a maximum difference value computed by the computing unit as the simulation target device.

7. A non-transitory computer-readable storage medium storing a program that, when executed by a computer, causes the computer to execute a method of image modulation, the method comprising:

obtaining device property information of a plurality of display devices respectively disposed at a plurality of image distribution destination apparatuses;

generating a plurality of simulated images based on a distribution target image to be transmitted to each of the image distribution destination apparatuses and the device property information of each of the display devices obtained by the obtaining;

selecting a display device from among the display devices based on device property information of each of the display devices as a simulation target device, the plurality of simulated images being generated such that, when the plurality of simulated images are displayed on a first display device,
the plurality of simulated images simulate, on the first display device, appearances of the distribution target as if the distribution target is being displayed on the plurality of display devices, respectively;

causing a display of a plurality of simulated images generated by the simulating;

modulating the distribution target image based on a modulation instruction received for the plurality of the simulated images displayed by the displaying;

generating a simulated image for the simulation target device selected by the simulation target device selection unit;

computing a difference between a standard color signal of the device property information and a standard color signal of a reference color; and selecting a display device having a maximum difference value computed by the computing unit as the simulation target device.

* * * * *